United States Patent
Taghavi Nasrabadi et al.

(10) Patent No.: US 8,473,821 B2
(45) Date of Patent: Jun. 25, 2013

(54) PACKET-LEVEL ERASURE PROTECTION CODING IN AGGREGATED PACKET TRANSMISSIONS

(75) Inventors: Mohammad Hossein Taghavi Nasrabadi, San Diego, CA (US); Hemanth Sampath, San Diego, CA (US); Simone Merlin, San Diego, CA (US); Santosh Paul Abraham, San Diego, CA (US); Sameer Vermani, San Diego, CA (US); Rahul Tandra, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 192 days.

(21) Appl. No.: 13/043,259

(22) Filed: Mar. 8, 2011

(65) Prior Publication Data

US 2012/0117446 A1 May 10, 2012

Related U.S. Application Data

(60) Provisional application No. 61/411,777, filed on Nov. 9, 2010.

(51) Int. Cl.
*H03M 13/00* (2006.01)
(52) U.S. Cl.
USPC ............ 714/776; 714/752; 714/758; 370/338
(58) Field of Classification Search
USPC ........................ 714/752, 758, 776; 370/338
See application file for complete search history.

(56) References Cited

U.S. PATENT DOCUMENTS

| | | | |
|---|---|---|---|
| 5,870,412 A | 2/1999 | Schuster et al. | |
| 7,068,729 B2 | 6/2006 | Shokrollahi et al. | |
| 2005/0015703 A1 | 1/2005 | Terry et al. | |
| 2006/0107166 A1 | 5/2006 | Nanda | |
| 2007/0186134 A1 | 8/2007 | Singh et al. | |
| 2008/0080437 A1* | 4/2008 | Krishnaswamy et al. | .... 370/338 |
| 2009/0141723 A1 | 6/2009 | Giesberts et al. | |
| 2009/0243813 A1* | 10/2009 | Smith et al. ................ | 340/10.51 |
| 2010/0318875 A1* | 12/2010 | Xu et al. ....................... | 714/752 |

FOREIGN PATENT DOCUMENTS

WO    WO2007070665 A2    6/2007

OTHER PUBLICATIONS

M. Luby, et al., "Raptor Forward Error Correction Scheme for Object Delivery", IETF RFC5053, pp. 1-46 (Sep. 2007).
M. Luby, et al., "RaptorQ Forward Error Correction Scheme for Object Delivery", IETF draft ietf-rmt-bb-fec-raptonrq-04, pp. 1-68, (Aug. 24, 2010).

(Continued)

*Primary Examiner* — Sam Rizk
(74) *Attorney, Agent, or Firm* — Kevin Cheatham

(57) ABSTRACT

In a first aspect, an aggregated packet (A-MPDU) includes packets (MPDUs) and EC-Blocks (Error Correction Blocks) containing error correction coding information. A transmitter uses a Fountain coding scheme (for example, Raptor or RaptorQ) to generate the error correction coding information from the MPDUs. If a receiver detects an error in a received MPDU, then the receiver uses the error correction coding information from the EC-Blocks to correct the error. In a second novel aspect, a determination is made as to whether a change in error rate is more likely due to collisions or to a low SNR. If the determination is that the change is due to collisions then the MCS index is adjusted to restore a target error rate, whereas if the determination is that the change is due to a low SNR then the number of EC-Blocks per A-MPDU is adjusted to restore the target error rate.

15 Claims, 21 Drawing Sheets

OTHER PUBLICATIONS

"Raptor Codes", by Amin Shokrollahi, IEEE Transactions on Information Theory, vol. 52, No. 6, pp. 2551-2567 (Jun. 2006).

"RaptorQ Technical Overview", Qualcomm Incorporated, pp. 1-12 (Oct. 1, 2010).

Ernst H et al: "Transport layer coding for the land mobile satellite channel", Proceedings / 2004 IEEE 59th Vehicular Technology Conference, VTC 2004-Spring : Towards a Global Wireless World ; May 17-19, 2004, Milan, Italy, IEEE Operations Center, Piscataway, NJ, vol. 5, May 17, 2004, pp. 2916-2920, XP010766784, DOI: 10.1109/VETECS.2004.1391458 ISBN: 978-0-7803-8255-8.

International Search Report and Written Opinion—PCT/US2011/060022—ISA/EPO—Apr. 23, 2012.

Ismail Dhama et al: "Meet in the Middle Cross-Layer Adaptation for Audiovisual Content Delivery", IEEE Transactions on Multimedia, IEEE Service Center, Piscataway, NJ, US, vol. 10, No. 1, Jan. 1, 2008, pp. 105-120, XP011199045, ISSN: 1520-9210, DOI: 10.1109/TMM.2007.911243.

Tahira Sadaf et al: "Link adaptive multimedia encoding in wireless networks: A survey of theory and approaches", Electronics and Information Engineering (ICEIE), 2010 International Conference on, IEEE, Piscataway, NJ, USA, Aug. 1, 2010, pp. V2-V5, XP031744123, ISBN: 978-1-4244-7679-4.

Yu Cao et al: "Cross-layer optimization of rateless coding over wireless fading channels" Communications (QBSC), 2010 25th Biennial Symposium on, IEEE, Piscataway, NJ, USA, May 12, 2010, pp. 114-149, XP031681282, ISBN: 978-1-4244-5709-0.

* cited by examiner

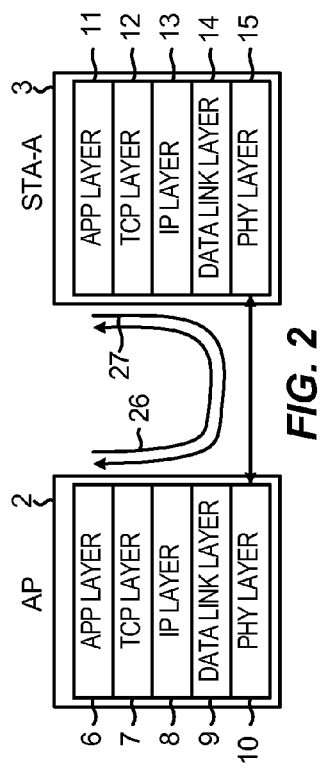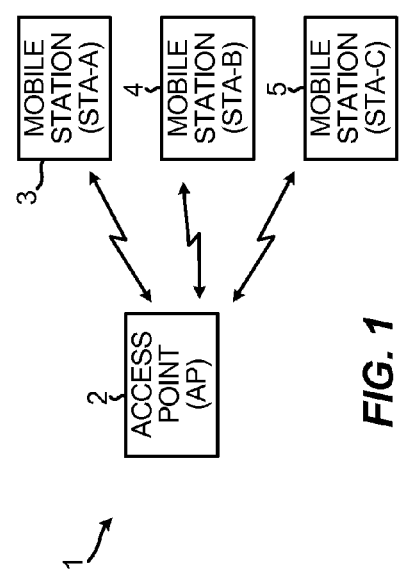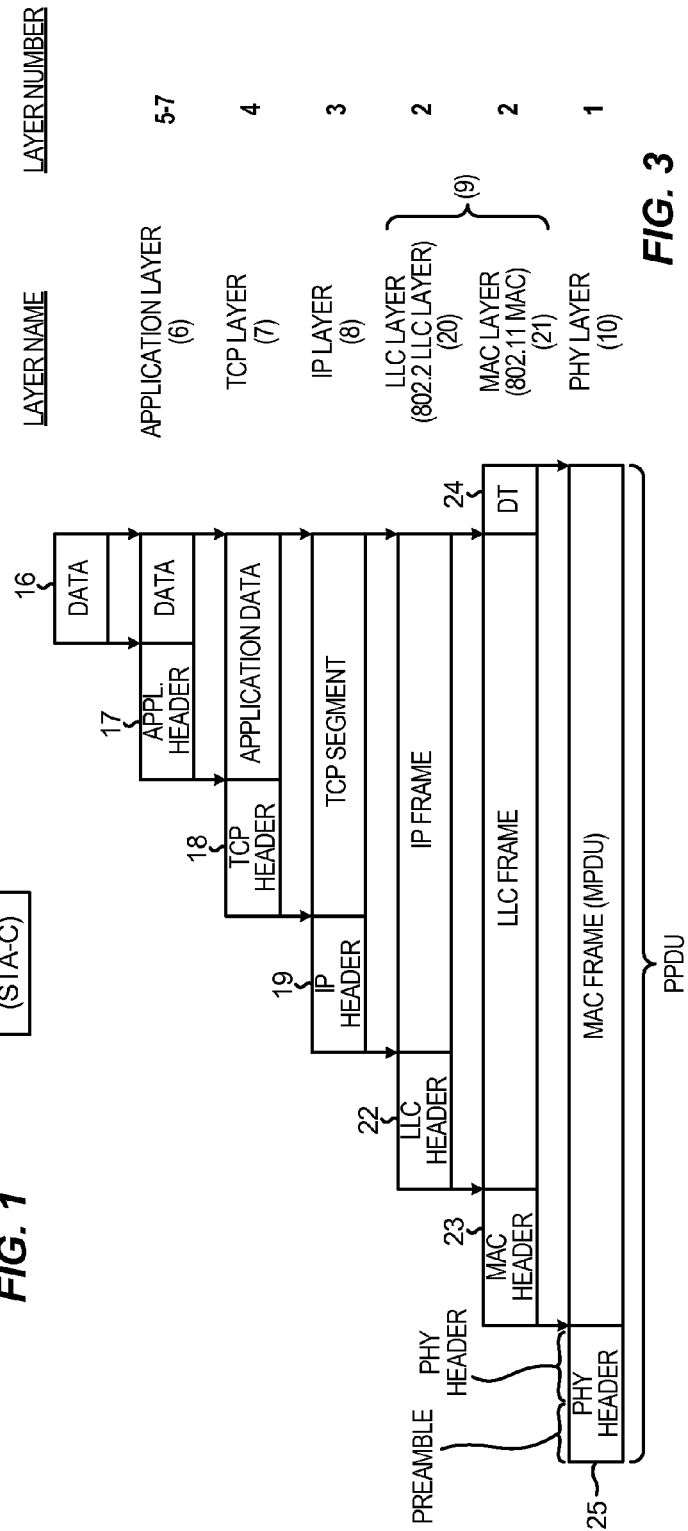

COMMUNICATION BETWEEN AP AND STA-C

A-MPDU INCLUDING EC-BLOCKS OF ERROR CORRECTION CODING INFORMATION

A FIRST EXAMPLE - EACH EC-BLOCK IS THE XOR OF SEVERAL OF THE MPDUS OF THE LEGACY SECTION

A SECOND EXAMPLE - EC-BLOCKS ARE NOT MPDUS AND
DO NOT HAVE MAC HEADERS

A THIRD EXAMPLE - EACH EC-BLOCK IS THE XOR OF SEVERAL OF THE MPDUS OF THE LEGACY SECTION

A FOURTH EXAMPLE - FOUNTAIN CODING SUCH AS A RAPTOR CODING IS USED TO GENERATE THE ERROR CORRECTION CODING INFORMATION FROM MPDUS OF THE LEGACY SECTION - THE EC-BLOCKS ARE MPDUS

A FIFTH EXAMPLE - FOUNTAIN CODING SUCH AS A RAPTOR CODING IS USED TO GENERATE THE ERROR CORRECTION CODING INFORMATION FROM MPDUS OF THE LEGACY SECTION - THE EC-BLOCKS ARE NOT MPDUS

RAPTOR ENCODING

PACKET-LEVEL ERASURE PROTECTION CODING IN AGGREGATED PACKET TRANSMISSIONS

CROSS-REFERENCE TO RELATED APPLICATION

This application claims the benefit under 35 U.S.C. §119 of Provisional Application Ser. No. 61/411,777, filed Nov. 9, 2010, entitled "PACKET-LEVEL ERASURE PROTECTION CODING IN AGGREGATED PACKET TRANSMISSIONS", which is expressly incorporated herein by reference in its entirety for all purposes.

BACKGROUND INFORMATION

1. Technical Field

The present disclosure relates to aggregated packets, and more particularly in one example to the including of Fountain-encoded error correction coding information into an aggregated packet such an A-MPDU in an IEEE 802.11 communication.

2. Background Information

In a communication system such as a WiFi communication system compliant with the Institute of Electrical and Electronic Engineers (IEEE) 802.11n standard, the communication of MAC (Medium Access Control) Protocol Data Units (MPDUs) can involve substantial protocol processing overhead due to a receiver of MPDUs having to return either an ACK (acknowledgement frame) or a NAK (negative acknowledgement frame) for each MPDU received. To reduce the overhead of having to handle these many ACK/NAK occurrences, the standard provides for a number of MPDUs to be transmitted in back-to-back fashion as a single Aggregated-MPDU (A-MPDU). Rather than the receiver having to acknowledge each MPDU separately, the receiver of the A-MPDU only need return one Block ACK (BA) per A-MPDU. There are, however, often limitations associated with the use of A-MPDUs that can lead to reduced transmission rates in some situations. Ways are sought to improve communication systems that use such A-MPDUs.

SUMMARY

In a first aspect, an aggregated packet includes a plurality of packets and one or more EC-Blocks (Error Correction Blocks). The EC-Blocks contain error correction coding information generated from the plurality of packets. In general, these EC-Blocks may be generated using various types of encoding methods, such as Hamming codes, Reed-Solomon codes, BCH codes, low-density parity-check (LDPC) codes, and Fountain codes. The aggregated packet is communicated such that the receiver does not need to return an acknowledgement for each packet, but rather returns a single block acknowledgement for the entire aggregated packet. In one example, the aggregated packet is an IEEE 802.11n compliant Aggregated-MPDU (A-MPDU) that contains a plurality of MPDUs and one or more EC-Blocks. A Fountain coding scheme, such as for example a Raptor forward error correction coding scheme or a RaptorQ forward error correction coding scheme, is used to generate the error correction coding information from the plurality of MPDUs. The resulting error correction coding information is broken into sections such that a first portion is included in a first EC-Block of the A-MPDU, such that a second portion is included in a second EC-Block of the A-MPDU, and so forth. In some examples, each EC-Block is a MAC layer MPDU and has a MAC layer header and a payload, where the payload is a portion of the error correction coding information. A receiver (for example, a mobile Station (STA)) can receive the A-MPDU (for example, from an Access Point (AP)), and if the receiver detects an error in an MPDU of the A-MPDU then the receiver can use a Fountain decoding scheme and the error correction coding information from one or more of the EC-Blocks of the A-MPDU to correct the error. The error is corrected such that the MPDU does not have to be retransmitted. Although it is mentioned here in connection with the communication of an A-MPDU from an AP to an STA in a IEEE 802.11 wireless system, the use of Fountain-encoded error correction information carried in an aggregated packet to erasure-protect the payload of the aggregated packet is not limited to AP-to-STA communications, is not limited to WiFi, is not limited to A-MPDUs, is not limited to IEEE 802.11 standard compliant systems, and is not limited to wireless communications, but rather applies generally to networking.

In a second novel aspect, a method controls a transmission error rate from an AP to a STA. In a first step of the method, a determination is made that a change in error rate has occurred. The error rate may, for example, be determined on a receiver that receives transmissions including A-MPDUs. In a second step, a determination is made as to whether the change is more likely due to collisions or is more likely due to a low SNR (Signal-to-Noise Ratio). In one example, this determination is made based on: 1) BA bitmaps in one or more Block-ACK (BA), and 2) Channel State Information (for example, a measured SNR obtained from the receiver of the AP). If the determination is that the change in error rate is more likely due to collisions, then the MCS (Modulation and Coding Scheme) index used to transmit is changed. The MCS index may, for example, be decreased to decrease transmission error rate thereby restoring a target error rate. If the determination is that the change in error rate is more likely due to a low SNR, then the number of EC-Blocks per A-MPDU is changed. The number of EC-Blocks per A-MPDU may, for example, be increased to decrease transmission error rate thereby restoring a target error rate. The method is usable to control the MCS index and the number of EC-Blocks per A-MPDU such that a target error rate is maintained.

The foregoing is a summary and thus contains, by necessity, simplifications, generalizations and omissions of detail; consequently, those skilled in the art will appreciate that the summary is illustrative only and does not purport to be limiting in any way. Other aspects, inventive features, and advantages of the devices and/or processes described herein, as defined solely by the claims, will become apparent in the non-limiting detailed description set forth herein.

BRIEF DESCRIPTION OF THE DRAWINGS

FIG. 1 is a diagram of a communication system that communicates Aggregated-MPDUs in accordance with one novel aspect.

FIG. 2 is a diagram showing the protocol stacks in the AP and in STA-A of FIG. 1.

FIG. 3 is a diagram that shows how data is included in a packet of each protocol layer of a protocol processing stack.

DETAILED DESCRIPTION

Figure 4:
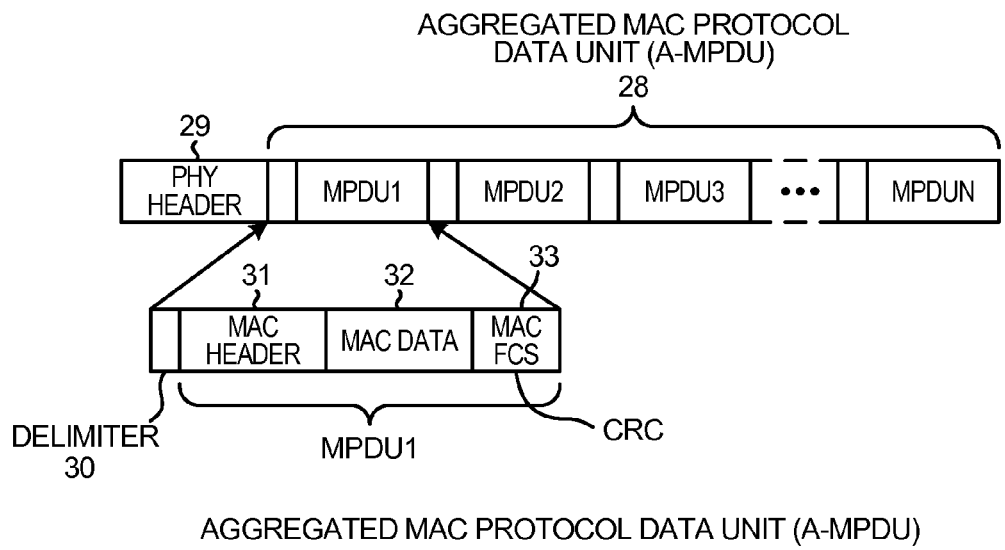
FIG. 4 is a diagram of a first example of an A-MPDU.

FIG. 1 is a diagram of an IEEE 802.11 wireless communication system 1 employing an Access Point device (AP) 2, a first mobile station device (STA-A) 3, a second mobile station device (STA-B) 4, and a third mobile station device (STA-C) 5. Each station device communicates with the access point using a set of protocols. The protocol processing functionality on the AP is referred to as a stack of protocol processing layers. In the example of FIG. 1, the layers of the stack include an application layer 6, a TCP layer 7, an IP layer 8, a data link layer 9, and a physical layer 10. Similarly, the protocol processing functionality on the STA is referred to as a stack of protocol processing layers. The layers include an application layer 11, a TCP layer 12, an IP layer 13, a data link layer 14, and a physical layer 15.

FIG. 2 is a diagram showing the protocol stacks in AP 2 and in STA-A 3. The stacks are implemented using combinations of hardware and software. If AP 2 is to send an amount of data 16 to STA-A 3, then the data 16 is passed to the application layer 6 of the stack in the AP. The application layer 6 adds a header 17.

FIG. 3 is a diagram that shows the header 17 appended to the data 16 to form an application layer packet. The application layer then passes this packet down to the TCP layer 7. The TCP layer adds a header 18 and passes the resulting packet down to the IP layer 8. The IP layer adds a header 19 and passes the resulting packet down to the data link layer 9. As indicated in FIG. 3, the data link layer 9 includes an LLC sub-layer 20 and a MAC sub-layer 21. The LLC and MAC layer are often referred to together as the MAC layer. An LLC header 22 and a MAC header 23 and MAC trailer 24 are added to form a MAC layer packet. Headers 22 and 23 are often referred to together as the MAC header. The MAC layer packet is passed down to the physical layer protocol processing layer 10. A MAC layer packet may be referred to as a MAC frame. A MAC layer packet may also be referred to as a MAC Protocol Data Unit or MPDU. The physical layer 10 adds a header 25 that more properly includes a header portion and a preamble, and communicates the resulting physical layer packet across the network. The physical layer packet may also be referred to as a Physical layer Protocol Data Unit of PPDU. In the present example, the communication is a wireless communication from AP 2 to STA-A 3.

The physical layer packet is processed by the physical layer 15 of the protocol processing stack of STA-A 3. The physical layer 15 removes the physical layer header and recovers the physical layer payload. This payload is then passed up to the data link layer 14 (MAC layer) of the stack. Each layer of the stack removes its header and recovers its payload, and passes its payload up to the next higher protocol processing layer of the stack. At the end of the process, the original data 16 is output from application layer 11 for use on STA-A 3. Arrow 26 represents this communication of the user data 16 from AP 2 to STA-A 3. Arrow 27 represents a reverse communication of user data from STA-A 3 to AP 2.

From the perspective of the MAC layer, the MAC layer forms packets (MPDUs) and communicates them across a channel provided by the lower layer of the protocol stack. If the MAC layer is to send an MPDU, then it generally sends the MPDU and waits. If the receiver of the MPDU receives the MPDU properly, then the receiver sends back a MAC acknowledgement packet called an ACK. If the receiver does not receive the MPDU or receives the MPDU with errors, then the receiver returns a MAC no-acknowledgment frame called a NAK. This back and forth communication of ACKs and NAKs involves protocol processing overhead for the AP and the STA-A, and is time consuming as well.

To reduce this overhead, a Block Acknowledgement (BA) packet aggregation function set forth in IEEE 802.11n may be employed. Rather than transmitting multiple individual MPDUs separately, each to be separately acknowledged by the return of a separate ACK, multiple MPDUs are transmitted together in back-to-back fashion in what is referred to as an aggregated MPDU or "A-MPDU". The multiple MPDUs of the A-MPDU can then be acknowledged together by the receiver using a single BA frame. The BA frame includes what is referred to as a BA bitmap, where there is one bit in the BA bitmap associated with each MPDU of the A-MPDU. Whether the MPDU was properly received or not (success/failure) is indicated by the state of the bit in the BA bitmap corresponding to the MPDU. Several variants of the A-MPDU and BA scheme exist.

FIG. 4 is a diagram of a first example of an A-MPDU 28 as the A-MPDU is communicated through the physical layer. After the physical layer header 29, several MPDUs follow.

MPDU1 is the first MPDU, MPDU2 is the second MPDU, and so forth. Each MPDU is preceded by a delimiter. The MPDU itself, as indicated by the exploded view of MPDU1, is preceded by a delimiter 30, and includes a MAC header 31, the MAC data or payload 32, and a MAC FCS (Frame Check Sequence) 33. The MAC FCS is typically a 32-bit Cyclic Redundancy Check (CRC) code. Padding bits (not shown) are added if necessary after the MAC FCS so that each MPDU is a multiple of four bytes in length.

Figure 5:
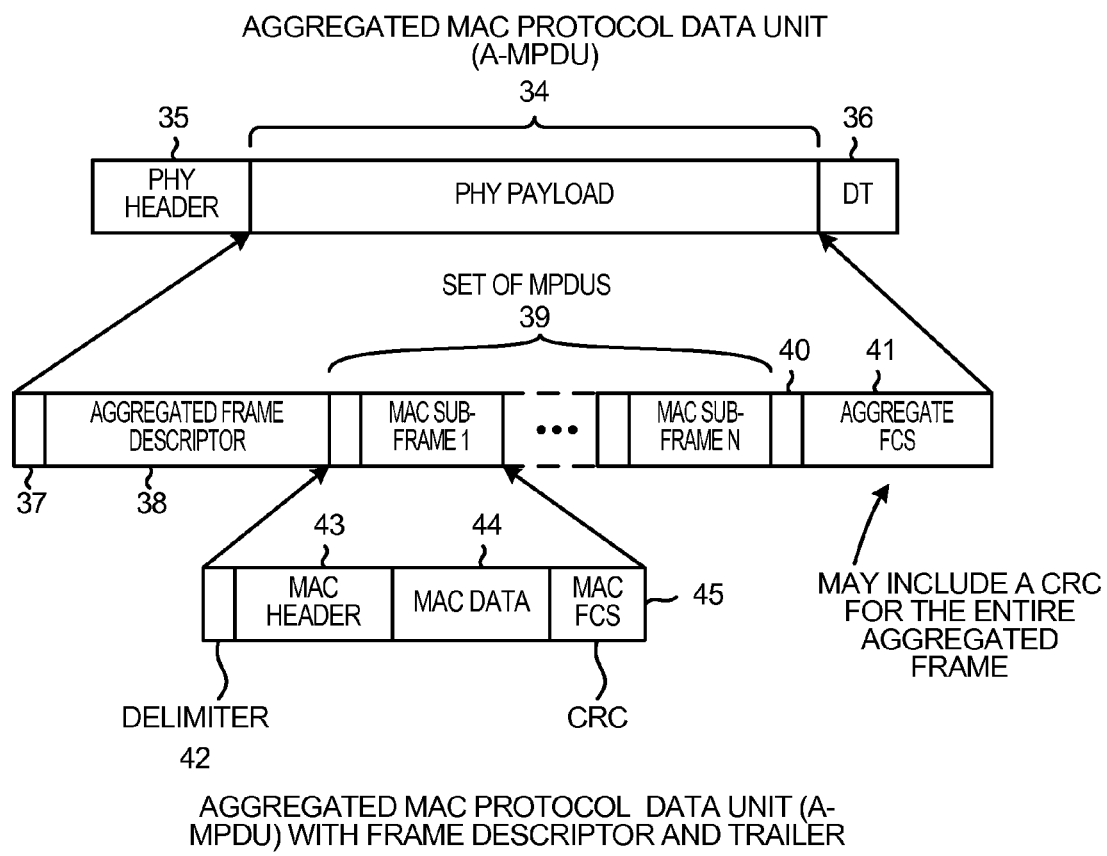
FIG. 5 is a diagram of a second example of an A-MPDU.

FIG. 5 is a diagram of a second example of an A-MPDU 34 as the A-MPDU is communicated through the physical layer. The physical layer frame in this case includes a physical layer header 35, the A-MPDU 34, and a physical layer trailer 36. The A-MPDU 34 in this case is said to include a delimiter 37 and an aggregated frame descriptor 38, as well as a set of delimiters and MPDUs 39. Each MPDU is preceded by its own delimiter. At the end of the set of MPDUs 39 is a delimiter 40 and an aggregate FCS 41. As illustrated by the callout of MAC SUB-FRAME 1, each MPDU is preceded by a delimiter 42, and includes a MAC header 43, MAC data or payload 44, and a MAC FCS 45. The aggregate FCS 41 may include a CRC code for the entire aggregated frame. Each MPDU is padded up to be a multiple of four bytes in length. In this example, PHY payload 34 is the A-MPDU.

FIGS. 6-9 illustrate how A-MPDUs can be communicated from AP 2 to three mobile stations STA-A 3, STA-B 4 and STA-C 5 in one example. In a first aggregated frame (A-MPDU) eight MPDUs are communicated. These MPDUs are designated 1A, 2A, 3A to 8A in the diagram. This A-MPDU is communicated to STA-A. In the example, STA-A successfully receives all the eight MPDUs except for MPDU 2A. STA-A returns a Block Acknowledgement (BA) designated BA-A1. The BA bitmap of BA-A1 indicates that MPDU 2A was not properly received. The AP therefore retransmits the MPDU 2A as the first MPDU at the beginning of the second aggregated frame transmission. In this example, eight MPDUs can be transmitted in a PPDU to a given mobile station, and the difference between the smallest Frame Sequence Number (FSN) of an MPDU in the A-MPDU and the largest frame sequence number in the A-MPDU is restricted to seven. The frame sequence numbers of an MPDU is found in its MAC header. Because AP 2 is to retransmit 2A with a sequence number of 2 in the second A-MPDU, the largest sequence number allowed in the second A-MPDU is 9. AP 2 therefore can only send one more MPDU (MPDU A9) in the second A-MPDU. MPDUs must be transmitted in sequence. Accordingly, the remaining slot times T15-T20 associated with the second A-MPDU cannot be used to communicate MPDUs from AP 2 to STA-A 3. After the communication of the second A-MPDU, the STA-A returns a BA in time slot T22 (designated BA-A2) to indicate proper communication of MPDUs 2A and 9A of the second A-MPDU.

Figure 7:
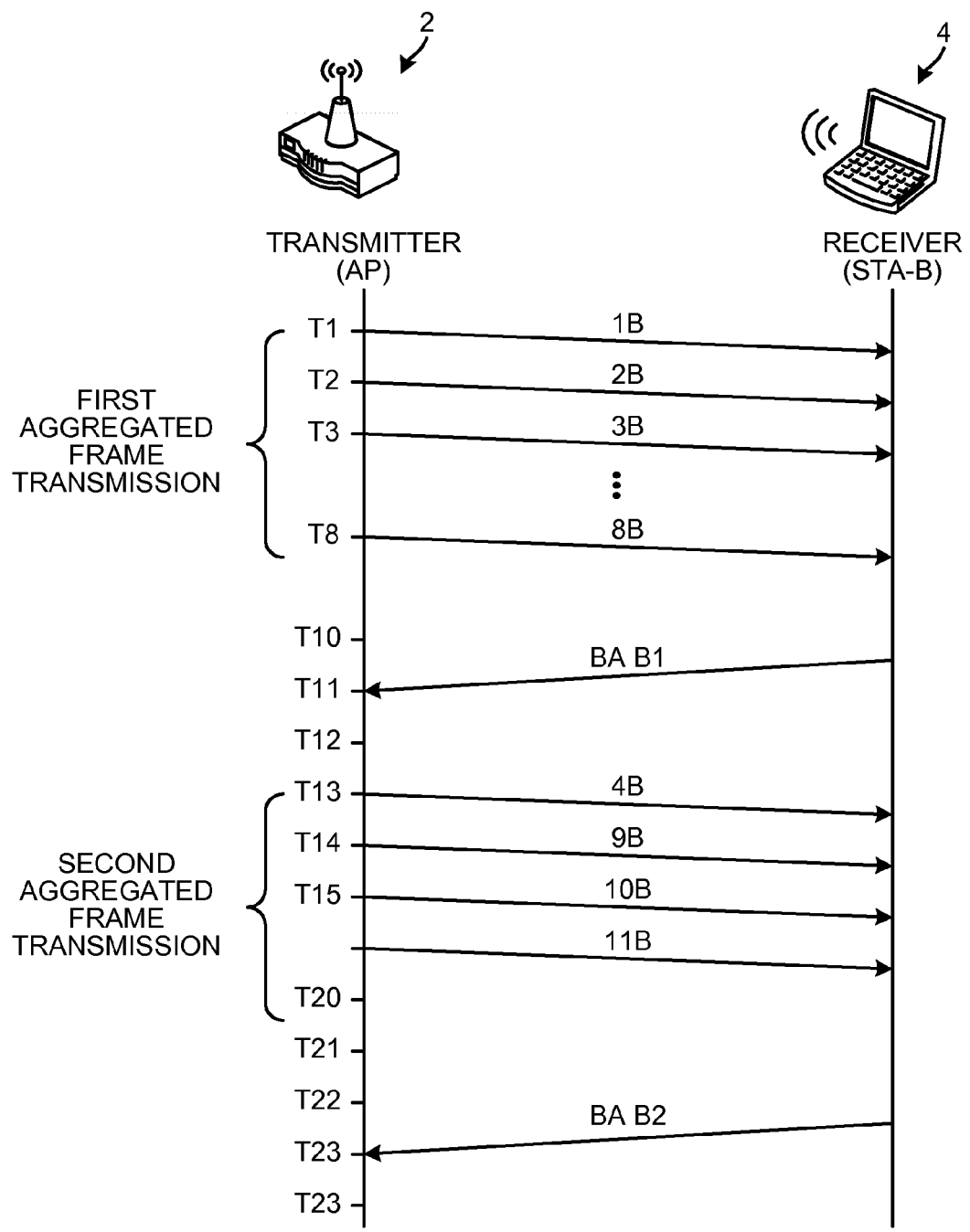
FIG. 7 illustrates how A-MPDUs can be communicated from the AP to STA-B of FIG. 1 in the example of FIG. 6.

FIG. 7 illustrates how the AP 2 communicates with STA-B 4. In the first aggregated frame, eight MPDUs are communicated. These are designated 1B, 2B, 3B to 8B in the diagram. In this example, STA-B receives all MPDUs except for 4B. STA-B returns a BA (designated BA-B1) with a BA bitmap indicating that MPDU 4B was not received correctly. Again, because the smallest and largest sequence numbers in a PPDU can only differ by 7, and because AP 2 must retransmit MPDU 4B with a sequence number of 4 at the beginning of the second A-MPDU, the largest sequence number that can be transmitted to STA-B in the second aggregated A-MPDU is 11. Accordingly, MPDU 4B is retransmitted, and then MPDUs 9B, 10B and 11B are transmitted, but time slots T17-T20 in the second A-MPDU are not used. STA-B then responds with a second BA at time slot T23 (designated BA-B2) indicating that MPDUs 4B, 9B, 10B, 11B were properly received.

Figure 8:
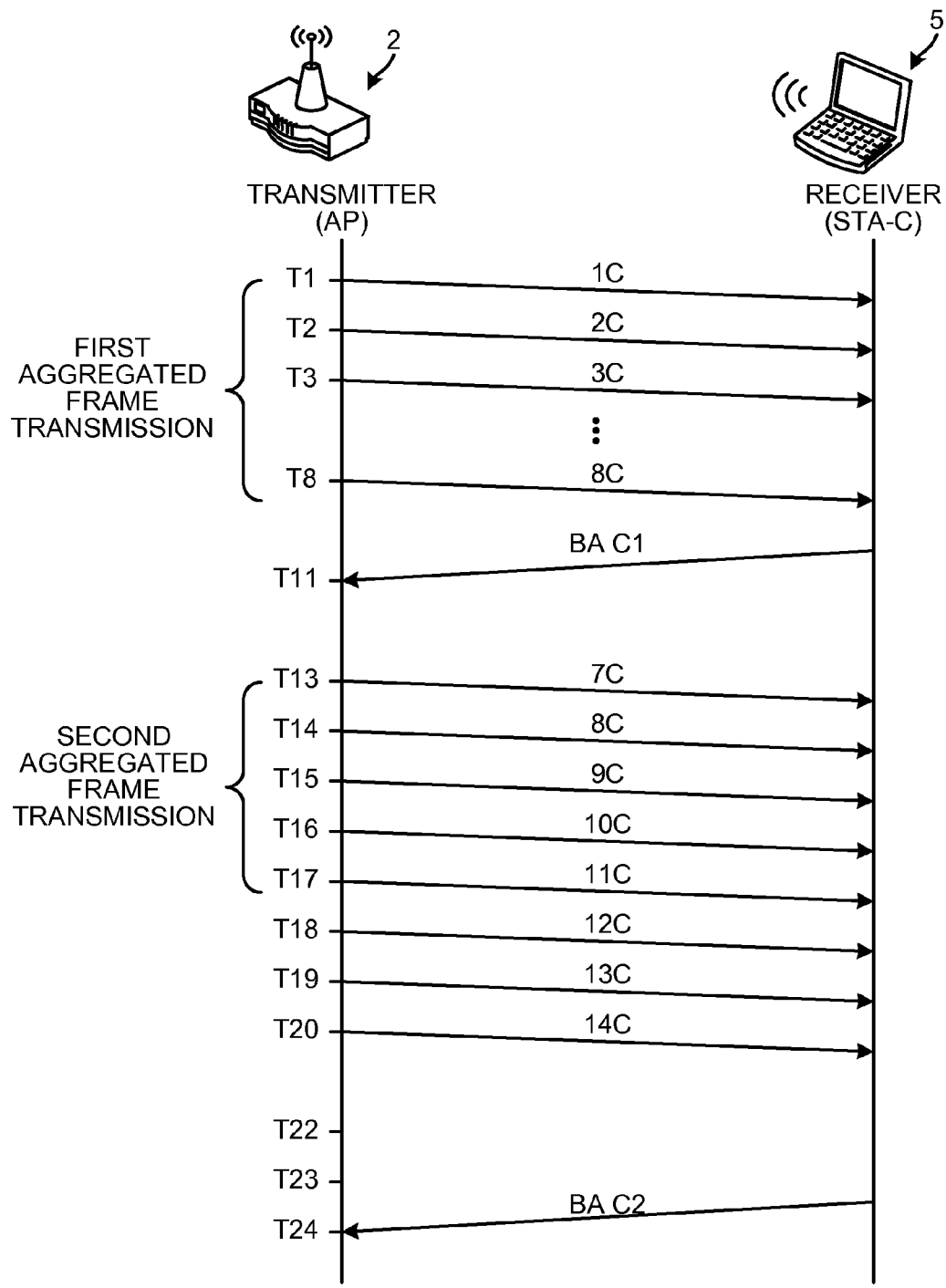
FIG. 8 illustrates how A-MPDUs can be communicated from the AP to STA-C of FIG. 1 in the example of FIG. 6.

FIG. 8 illustrates how the AP 2 communicates with STA-C 5. In the first aggregated frame, eight MPDUs are communicated. These are designated 1C, 2C, 3C to 8C in the diagram. In this example, STA-C receives all MPDUs except for 7C and 8C. STA-C returns a BA at time slot T11 (designated BA-C1) with a BA bitmap indicating that MPDUs 7C and 8C were not received correctly. MPDUs 7C and 8C are retransmitted at the beginning of the second A-MPDU. The smallest sequence number used in the second A-MPDU to communicate with STA-C is 7, so the largest sequence number allowed in the second A-MPDU is 14. AP 2 therefore retransmits MPDUs 7C and 8C, and then transmits MPDUs 9C, 10C, 11C, 12C, 13C and 14C. STA-C then responds with a second BA at time slot T24 (designated BA-C2) indicating that all the MPDUs of the second A-MPDU were received properly.

Figure 6:
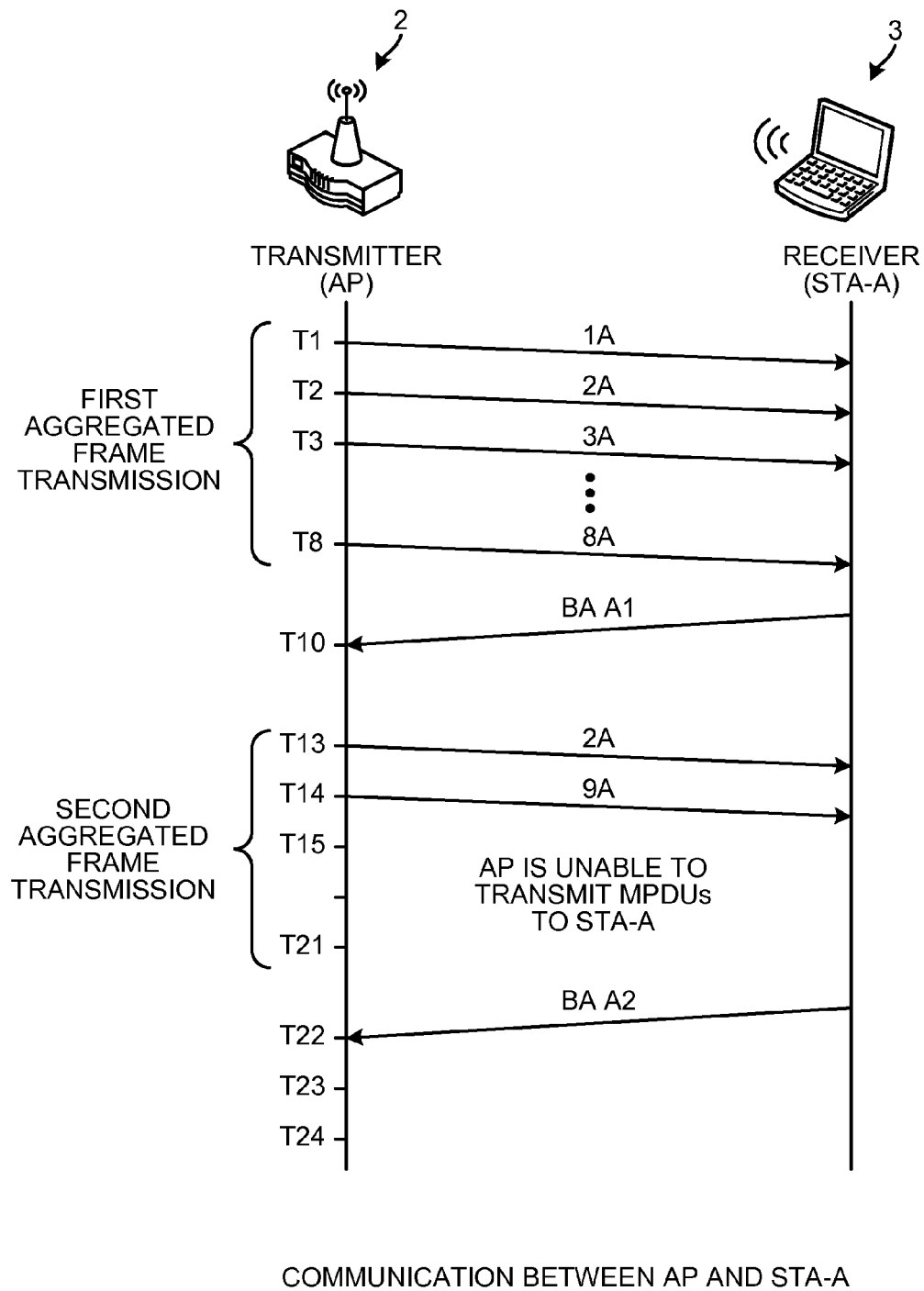
FIG. 6 illustrates how A-MPDUs can be communicated from the AP to STA-A of FIG. 1 in one example.
Figure 9:
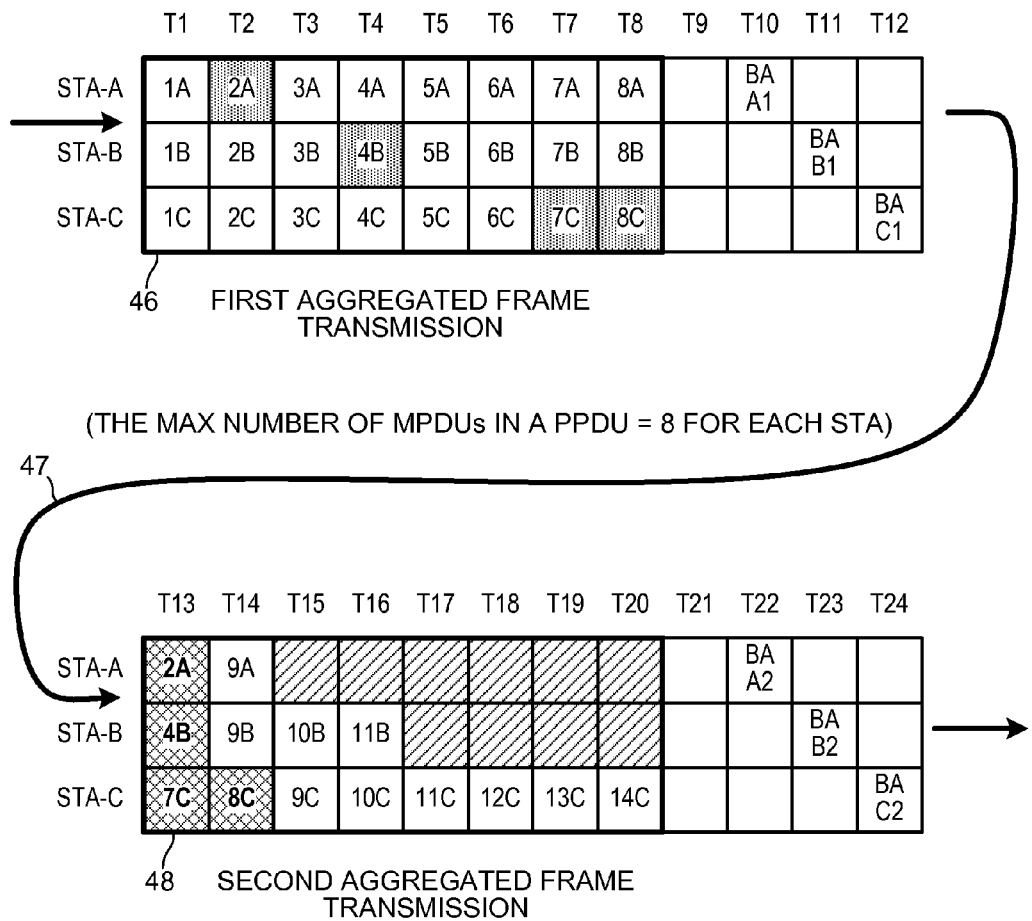
FIG. 9 is a diagram illustrating how the communication of FIGS. 6, 7 and 8 occur and how random errors in A-MPDUs result in a reduction in network efficiency.

FIG. 9 is a diagram illustrating how the communication of FIGS. 5, 6 and 7 occurs. Previously (not shown in FIG. 9) the PHY headers for each of the A-MPDUs of FIGS. 5, 6 and 7 are communicated from the AP. STA-A receives the PHY header of the A-MPDU transmitted to it, STA-B receives the PHY header of the A-MPDU transmitted to it, and STA-C receives the PHY header of the A-MPDU transmitted to it. Then, in time slot T1, the AP 2 communicates MPDU 1A to STA-A, MPDU 1B to STA-B, and MPDU 1C to STA-C. These MPDUs are communicated simultaneously, but due to the operation of the system each mobile station is able to receive its intended MPDU and is able to ignore the other transmissions. The dark block 46 in FIG. 9 indicates the first aggregated frame transmissions involving twenty-four MPDUs. This first aggregated frame transmission actually involves the transmission of three A-MPDUs, one to each of STA-A, STA-B and STA-C. In time slot T2, the AP communicates MPDU 2A to STA-A, MPDU 2B to STA-B, and MPDU 2C to STA-C. As indicated by the shading, MPDU 2A is not properly received but MPDUs 2B and 2C are properly received. MPDUs are communicated from AP 2 in the subsequent times slots T3-T8 as indicated. STA-A returns its BA (BA-A1) in time slot T10, STA-B returns its BA (BA-B1) in time slot T11, and STA-C returns its BA (BA-C1) in time slot T12. The heavy arrow 47 indicates subsequent process flow. A physical layer header for the second PPDU for each of the mobile stations is transmitted (not shown) from the AP 2, and then the transmissions of a set of second A-MPDUs. The dark block 48 in FIG. 9 indicates the second aggregated frame transmissions. In time slot T13, MPDU 2A is retransmitted to STA-A, MPDU 4B is retransmitted to STA-B, and MPDU 7C is retransmitted to STA-C. The transmission of MPDUs proceeds as indicated in FIGS. 6, 7 and 8 from time slot to time slot through the time slots of the second aggregated frame transmissions 48. Unfortunately, due to having to retransmit MPDUs and due to the limitation that the maximum difference in sequence numbers in a PPDU to a given STA being 7, the AP 2 is not able to transmit MPDUs to STA-A and to STA-B during some of the available time slots of the second A-MPDU. Times when the AP 2 is not able to transmit MPDUs are indicated in FIG. 9 with shading labeled "DEAD AIR".

Figure 10:
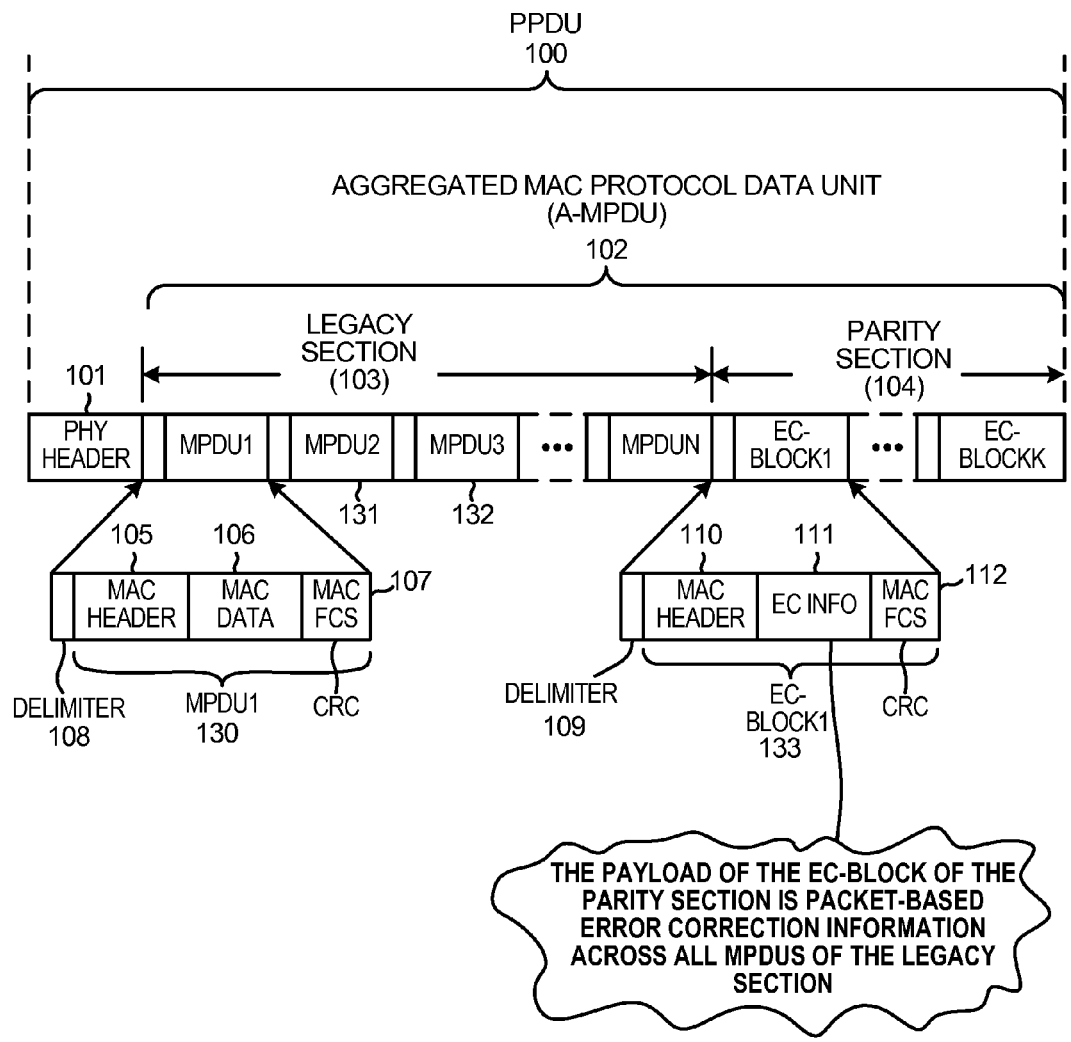
FIG. 10 is a diagram of an A-MPDU involving EC-Blocks of error correction coding information in accordance with one novel aspect.

FIG. 10 is a diagram of an A-MPDU 102 that involves error correction coding information in accordance with one novel aspect. The A-MPDU 102 is shown as part of a Physical level Protocol Data Unit (PPDU) 100. PPDU 100 includes a PHY header 101 and the physical layer payload 102. Payload 102 in this case is the A-MPDU. A-MPDU 102 includes a legacy section 103 and a section referred to here as a parity section 104. Parity section 104 can also be referred to as the error correction section. Legacy section 103 includes a set of MPDUs, each preceded by its own delimiter as illustrated. MPDU1 130 is the first MPDU; MPDU2 131 is the second MPDU; MPDU132 is the third MPDU, and so forth. Each delimiter contains a pre-determined combination of bits as a signature that can be used by the receiver to determine the beginning of each MPDU within the A-MPDU. The payloads of these MPDUs carry the data payload of the MAC layer communication. Each of these MPDUs, as indicated by the exploded view of MPDU1 130, includes a MAC header 105, the MAC data or payload 106, and a MAC FCS (Frame Check Sequence) 107. Each MPDU is preceded by its own delimiter as illustrated. Delimiter 108 is the delimiter that precedes MPDU1. The MAC FCS is typically as 32-bit Cyclic Redundancy Check (CRC) code. Padding bits (not shown) are added if necessary after the MAC FCS so that each MPDU is a multiple of four bytes in length. This legacy portion 103 of the A-MPDU is of standard and conventional form. The parity section 104, however, is added and includes one or more EC-Blocks (Error Correction Blocks). In one example, the EC-Blocks are MPDUs that involve MAC headers, MAC data or payloads, and MAC FCS portions. In another example, the EC-Blocks have no headers.

In the example of FIG. 10, the EC-Blocks of parity section 104 are MPDUs. As indicated in the exploded view of EC-Block1 133, each EC-Block is preceded by a delimiter, and includes a MAC header, MAC data or payload, and MAC FCS. Delimiter 109 is the delimiter for EC-Block1 133. EC-Block1 133 includes MAC header 110, MAC data or payload 111, and MAC FCS 112. The MAC data or payload, however, in the case of an EC-Block, includes error correction coding information (EC INFO) usable to correct MPDUs of the legacy section if one or more MPDUs of the legacy section should become corrupted or lost.

Although in the example shown in FIG. 10 the EC-Blocks are transmitted at the end of the A-MPDU, EC-Blocks may also be transmitted at the beginning of the A-MPDU, or between two MPDUs that contain data in the legacy section. In order to enable the receiver to determine which MPDUs or Blocks are EC-Blocks, certain information can be inserted in the header of the MPDUs that carry EC-Blocks. In particular, each header contains "Type" and "Sub-type" fields, each comprising one or more bits. For any MPDU, the combination of these bits determines the type of information contained in the MPDU. For EC-Blocks, a new combination of Type and Subtype bits is defined to indicate that the associated MPDU contains an EC-Block. Furthermore, using the Duration field of the header, the transmitter communicates the length of the EC-Block. In the Sequence Control field of the header, the transmitter communicates an index or sequence number of the EC-Block, to enable the receiver to distinguish between different EC-Blocks. Some of the fields in the MAC header of an MPDU containing an EC-Block, such as Address fields, may not be applicable for the EC-Blocks, so these fields may be omitted from the MAC header to save channel time. In the alternative method described here, a receiver first determines that the MPDU contains an EC-Block, and then interprets the rest of the MAC header fields according to the definition for EC-Blocks, rather than according to the definition for ordinary data MPDUs. Another method for identifying EC-Blocks is to use the existing bit fields or signature fields in the delimiter preceding the EC-Block to mark the following EC-Block. For example, instead of the signature that is contained in the delimiters preceding data MPDUs, the transmitter can insert a different signature into the delimiters preceding EC-Blocks so that the different signature identifies the following MPDU as an EC-Block.

Figure 11:
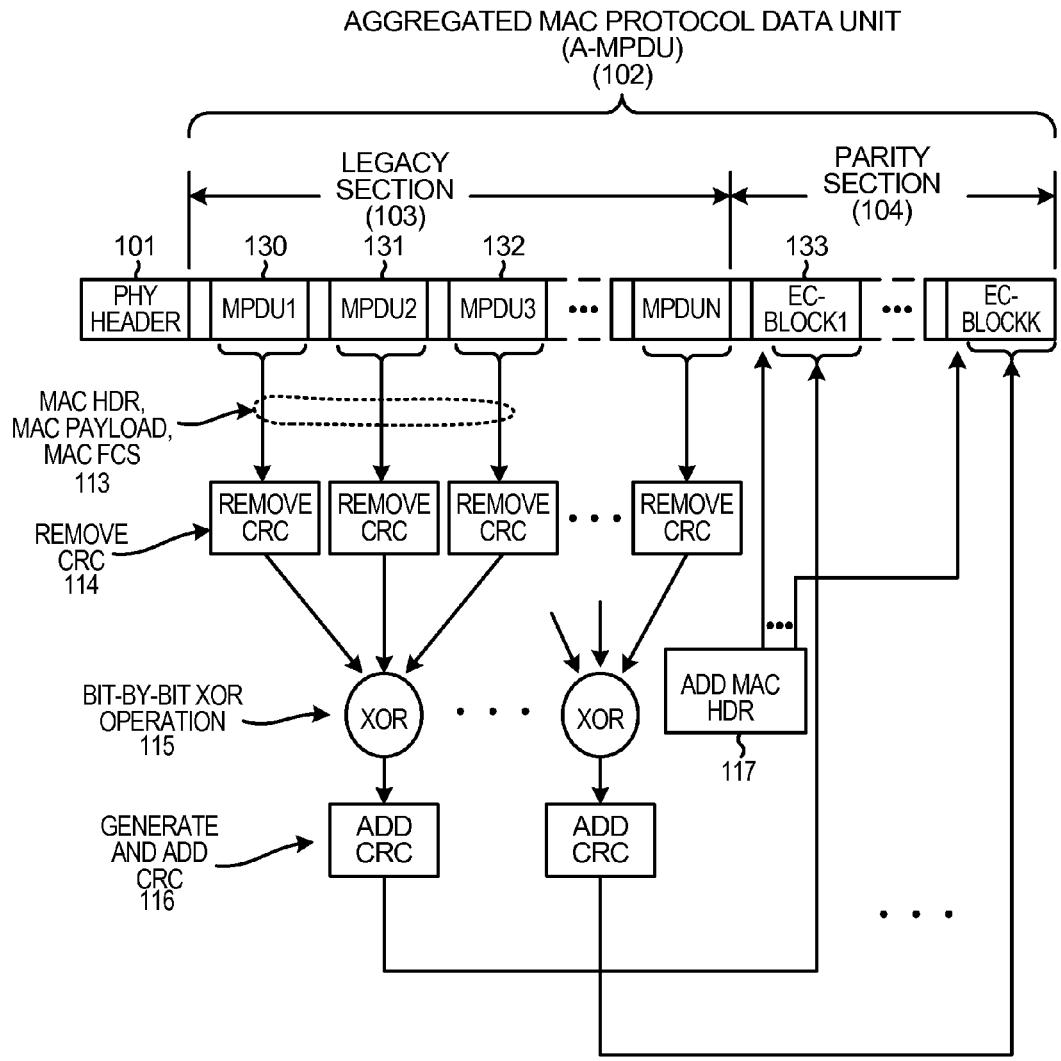
FIG. 11 is a diagram of a first example of how the EC-Blocks of FIG. 10 can be generated.

FIG. 11 is a diagram of a first example of how the EC-Blocks of the parity section 104 of FIG. 10 are determined The MPDUs of the legacy section are considered 113 in groups of three. MPDU1, MPDU2 and MPDU3 are considered first. The CRC is removed 114 from each MPDU, leaving the MAC header and MAC payload. Each respective bit of each of these three extracted MPDUs is then XORed in a bit-by-bit XOR operation 115. The result has the same number of bits as the MAC header and MAC payload of one of the extracted MPDUs. The result forms the MAC payload of the first EC-Block1 133. A CRC error detection code is generated 116 from the result of the XOR operation, and the CRC is appended to the end of the XOR result to form the MAC FCS portion of EC-Block1 133. A proper MAC header is added 117 to complete EC-Block1 133. Accordingly, the payload of EC-Block1 133 is the result of the XOR of the headers and payloads of the three MPDUs: MPDU1 130, MPDU2 131, and MPDU3 132 of the legacy section. The length of EC-Block1 133 may be longer than the MPDUs of the legacy section from which it is generated. This same process is repeated for the next three MPDUs of the legacy section, MPDU4, MPDU5 and MPDU6. The resulting EC-Block2 is the second EC-Block of the parity section. In this way, error correction coding information for successive each set of three MPDUs of the legacy section is carried in the payload of a corresponding one of the EC-Blocks of the parity section.

Figure 12:
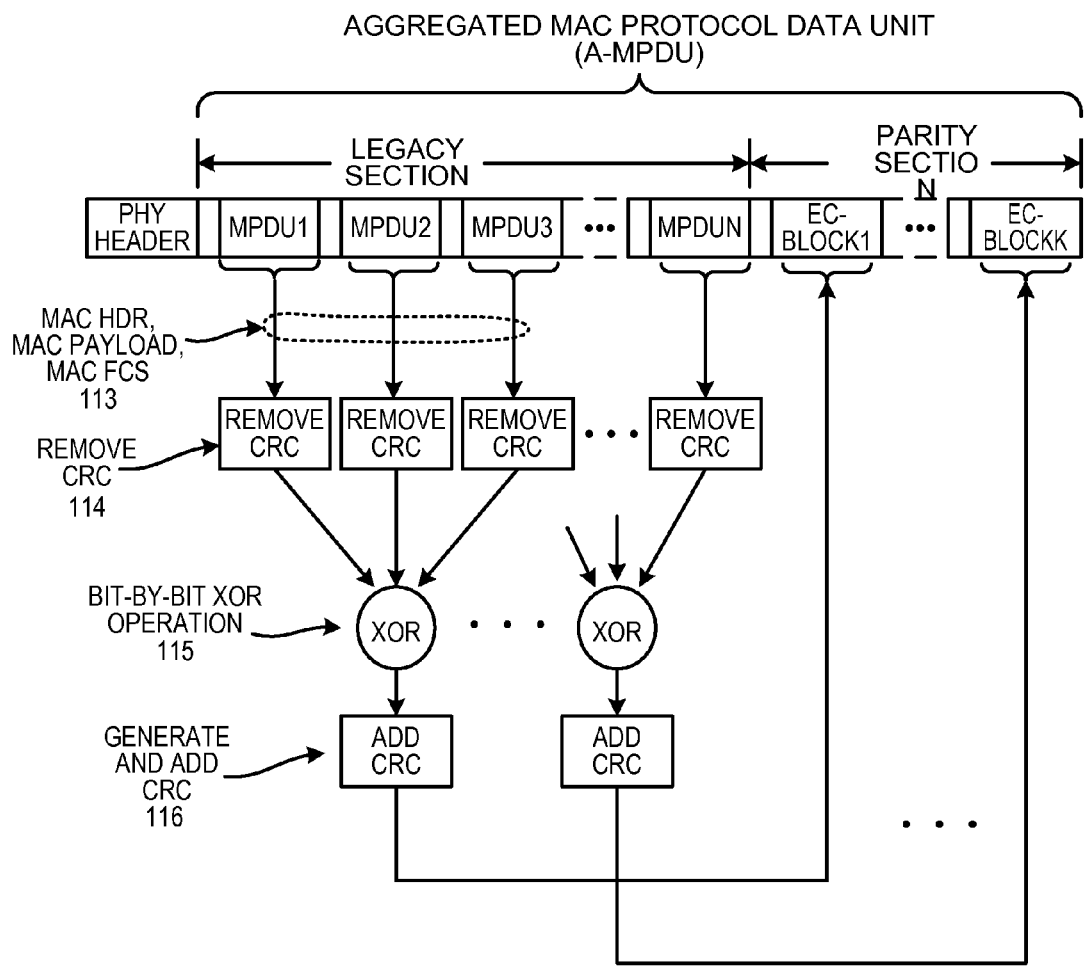
FIG. 12 is a diagram of a second example of how the EC-Blocks of FIG. 10 can be generated.

FIG. 12 is a diagram of a second example of how the EC-Blocks of the parity section 104 of FIG. 10 can be determined The process of FIG. 12 is similar to the process of FIG. 11, except that the EC-Blocks of the parity section are not MPDUs and do not include MAC headers.

Figure 13:
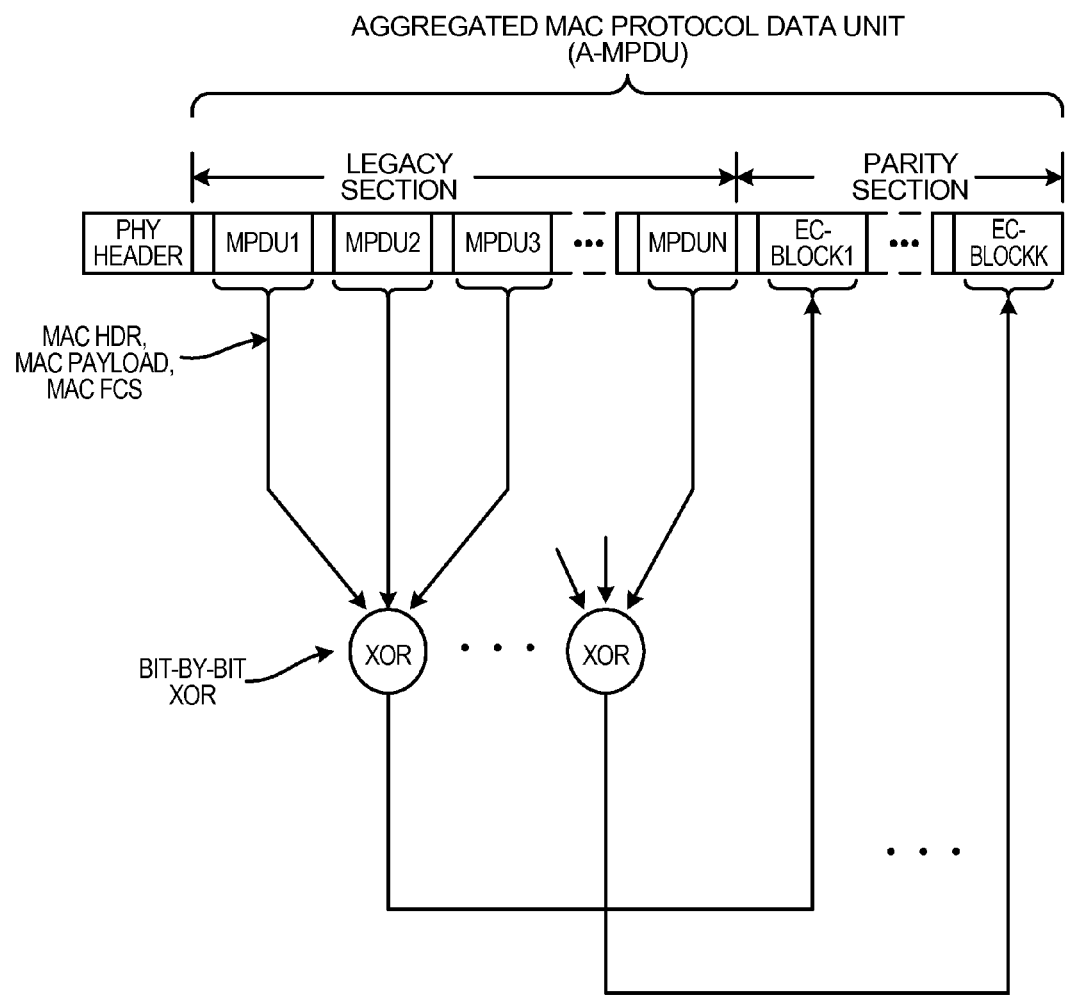
FIG. 13 is a diagram of a third example of how the EC-Blocks of FIG. 10 can be generated.

FIG. 13 is a diagram of a third example of how the EC-Blocks of the parity section 104 of FIG. 10 can be determined The process of FIG. 13 is similar to the process of FIG. 12, except that the CRC information of the MPDUs of the legacy section are included in the XOR operation and no extra adding of CRC information is performed. While in FIGS. 11, 12, and 13 the first three MPDUs enter the first XOR block, the subset of MPDUs that enter each XOR block can be selected based on a scrambled, arbitrary, or pseudo-random selection from the set of MPDUs in the A-MPDU. Furthermore, the number of MPDUs that enter the XOR blocks may vary from one XOR block to another.

Figure 14:
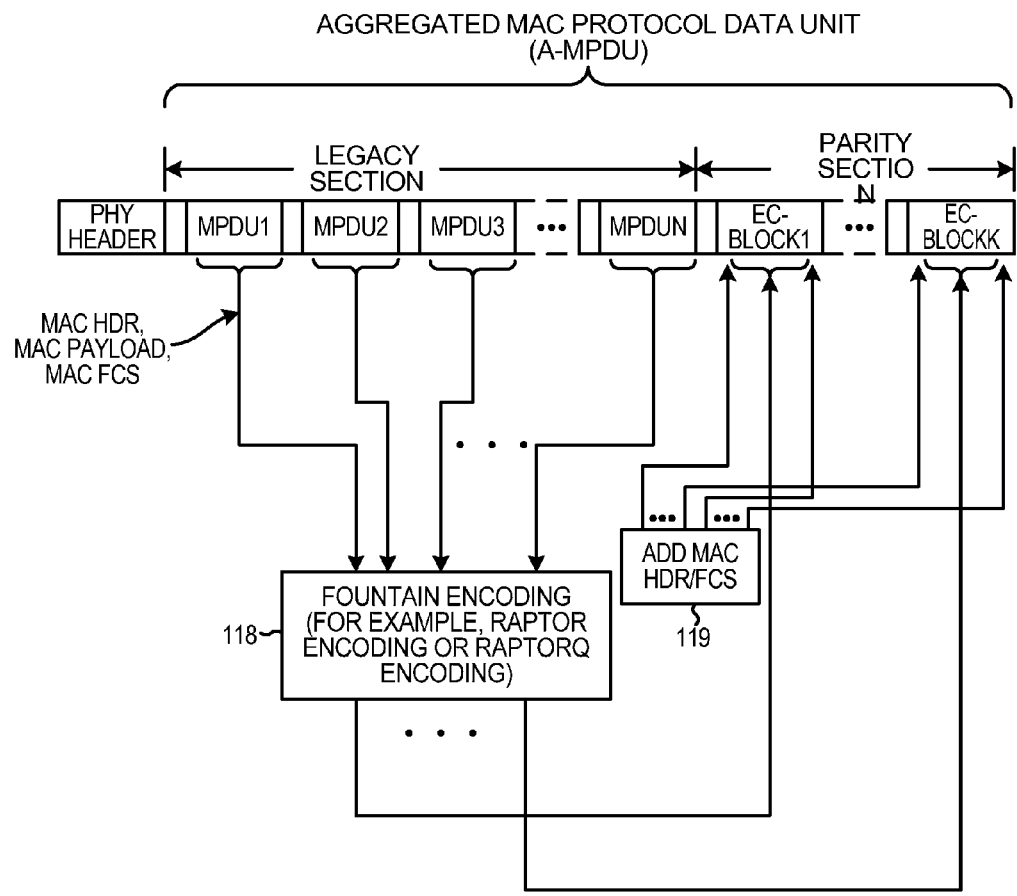
FIG. 14 is a diagram of a fourth example of how the EC-Blocks of FIG. 10 can be generated.

FIG. 14 is a diagram of a fourth example of how the EC-Blocks of the parity section 104 of FIG. 10 can be determined. The MAC headers, payloads, and MAC FCS portions of all the MPDUs of the legacy section are concatenated together and the result is used as one multi-bit input value by a Fountain encoder 118 that applies a Fountain encoding scheme. Fountain encoder 118 uses the multi-bit input value to generate one multi-bit output value. A first portion of the output value is carried as the payload of the first EC-Block1, a second portion of the output value is carried as the payload of the second EC-Block2, and so forth. Each EC-Block is an MPDU and is provided 119 with its own MAC header, and its own MAC FCS.

In coding theory, Fountain codes (also known as rateless erasure codes) are a class of erasure codes with the property that the encoder can generate any number of symbols on-the-fly from the source symbols of a source block of data. The term "Fountain" or "rateless" refers to the fact that these codes do not exhibit a fixed code rate. Raptor codes (Rapid Tornado codes) are a class of Fountain codes. Raptor codes have very efficient linear time encoding and decoding algorithms, and require only a small constant number of XOR operations per generated symbol for both encoding and decoding. IETF (Internet Engineering Task Force) RFC 5053, entitled "Raptor Forward Error Correction Scheme for Object Delivery", September 2007, specifies in detail a first Raptor coding scheme that is usable to generate the error correction coding information for the EC-Blocks of FIG. 14. Raptor codes are described in U.S. Pat. No. 7,068,729, entitled "Multi-Stage Code Generator And Decoder For Communication Systems", by Amin Shokrollahi et al., Jun. 27, 2006 (the entire content of which is incorporated by reference herein). Raptor codes are also described in the article entitled "Raptor Codes", by Amin Shokrollahi, IEEE Transactions on Information Theory, Vol. 52, No. 6, pages 2551-2567 (June 2006). Internet-Draft "draft-ietf-rmt-bb-fec-raptorq-04", Aug. 24, 2010, of the IETF (Internet Engineering Task Force), entitled "RaptorQ Forward Error Correction Scheme for Object Delivery draft-ietf-rmt-bb-fec-raporq-04", specifies in detail a second Raptor coding scheme, known as RaptorQ, that is usable to generate the error correction coding information for the EC-Blocks of FIG. 14. Copies of the IETF documents setting forth these Raptor coding schemes are freely available on the internet at www.ietf.org, and from the IETF at 48377 Fremont Blvd., Suite 117, Fremont, Calif. 94538. RaptorQ is also described in the document entitled "RaptorQ Technical Overview", published by Qualcomm Incorporated, pages 1-12, published Oct. 1, 2010. This document is also freely available on the internet at www.Qualcomm.com. In the general terminology of these documents, the MPDUs of an A-MPDU may be considered to be the source data, where individual MPDUs may be considered to be source symbols. The encoder generates repair symbols from the source symbols. In some cases, an EC-Block can be referred to as a repair symbol. In one typical implementation described in these documents, a set of encoded symbols is transmitted, where the encoded symbols include a combination of source symbols and repair symbols. After being received, the decoder decodes the encoded symbols and from them recovers the original source symbols even if some of the encoded symbols are received with errors or are not received at all.

Figure 15:
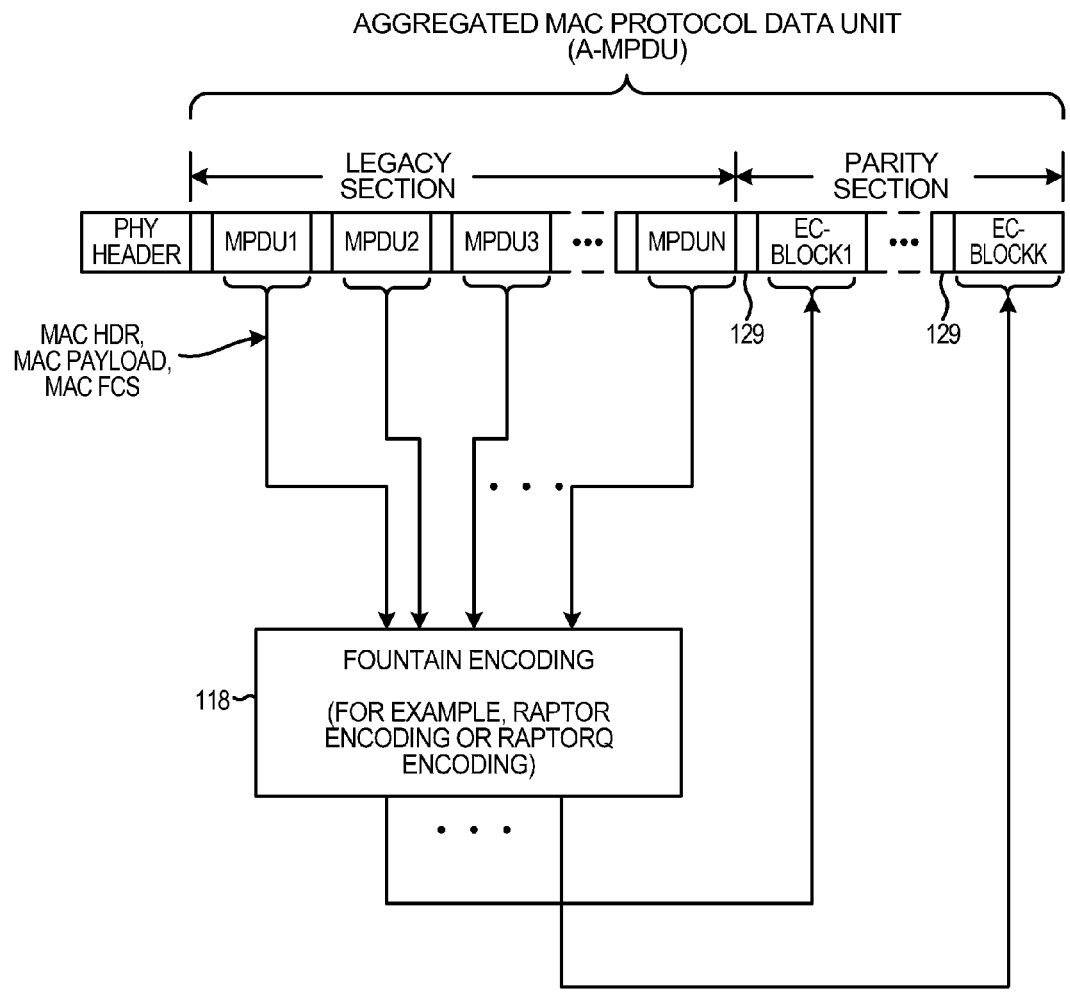
FIG. 15 is a diagram of a fifth example of how the EC-Blocks of FIG. 10 can be generated.

FIG. 15 is a diagram of a fifth example of how the EC-Blocks of the parity section 104 of FIG. 10 can be determined The process of FIG. 15 is similar to the process of FIG. 14, except that the EC-Blocks of the parity section are not MPDUs and do not include MAC headers. The multi-bit output of the Fountain encoder 118 is sectioned, and each section becomes an EC-Block, with each such EC-Block being preceded by its own delimiter. Reference numerals 129 identify the delimiters in the parity section.

The process of generating the multi-bit output value of the Fountain encoder can be implemented in the transmitter apparatus in hardware and/or in software. Furthermore, the encoding may be implemented in a parallel or pipelined manner. MPDUs can be encoded separately, or in groups. In this way an MPDU that enters the encoder does not have to wait for the encoding of a prior MPDU to finish. The encoded information from a prior MPDU of the A-MPDU may, for example, be passed on for further processing, and on to the transmitter, and possibly transmitted, while the Fountain encoder is performing the encoding operation on subsequent MPDUs of the A-MPDU. EC-Blocks may be (partly) generated by a number of different encoders that work in parallel to save time.

Figure 15A:
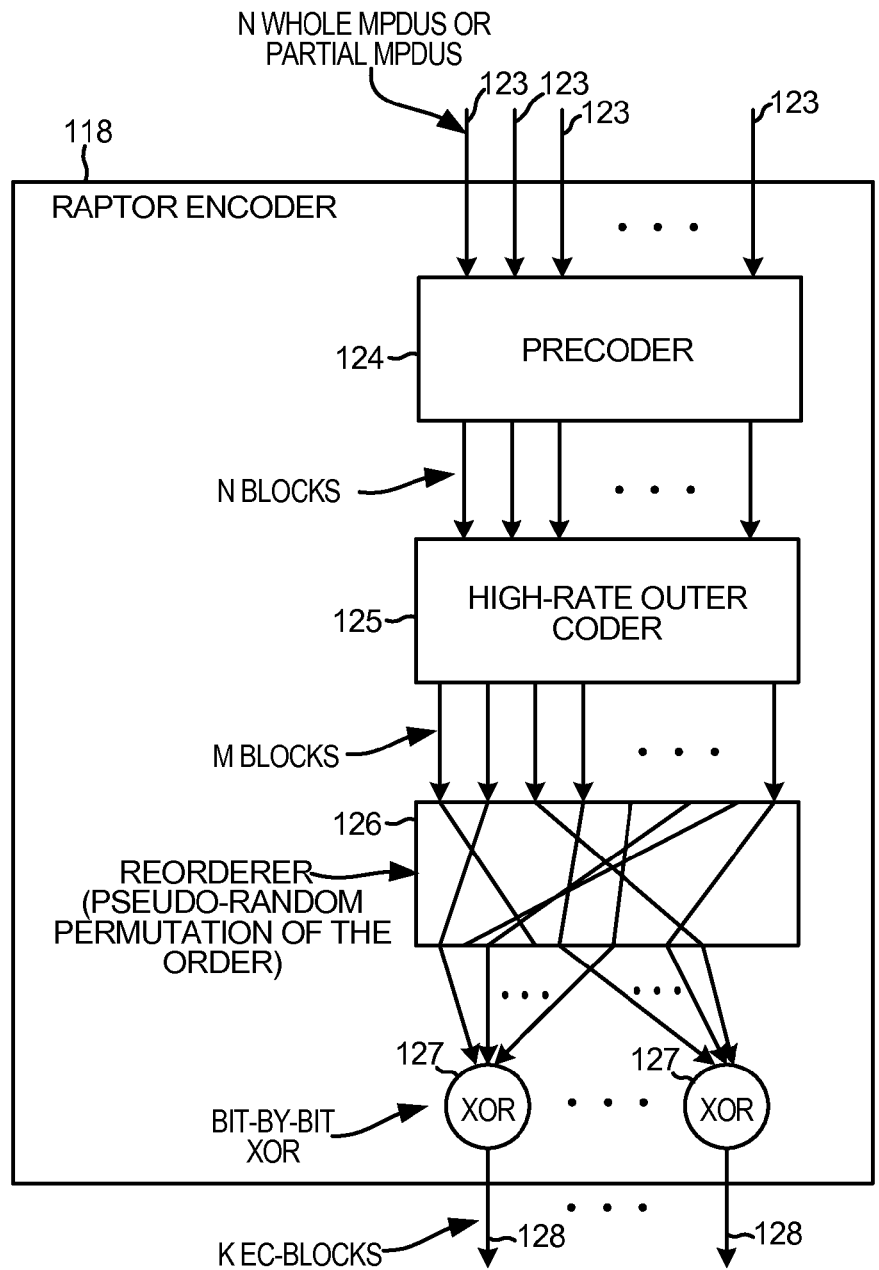
FIG. 15A is a diagram of one example of the Fountain encoder 118 of FIG. 15.

FIG. 15A is a diagram of one example of the operation of the Raptor encoder 118 of FIG. 15. RaptorQ encoding is considered to be a special case of Raptor encoding, and therefore the operation of FIG. 15A is also carried out if RaptorQ encoding is used. N inputs are represented by arrows 123. These N inputs may be whole MPDUs, or alternatively may be N partial MPDUs. The N inputs enter the Raptor encoder and are supplied to a predecoder 124. Precoder 124 processes the N inputs to make the Raptor code systematic and outputs N blocks. A high rate outer coder 125 then takes the N blocks and generates M blocks by adding redundant information, where M may be slightly larger than N. This outer code may be based on a cyclic code, a low-density parity-check code, a high-density parity-check code, or on multiple codes. The M blocks as output by high-rate outer coder 125 are then reordered based on a pseudo-random selection of the M blocks by reordering functionality 126, and the reordered outer code outputs are supplied to a set of XOR blocks 127 as illustrated. Each XOR block 127 performs a bit-by-bit XOR operation over its input, and outputs an EC-Block. Arrows 128 represent the resulting K EC-Blocks as output by the XOR blocks 127. As indicated in FIG. 15, a delimiter is appended to the front of each of the K EC-Blocks.

Figure 16:
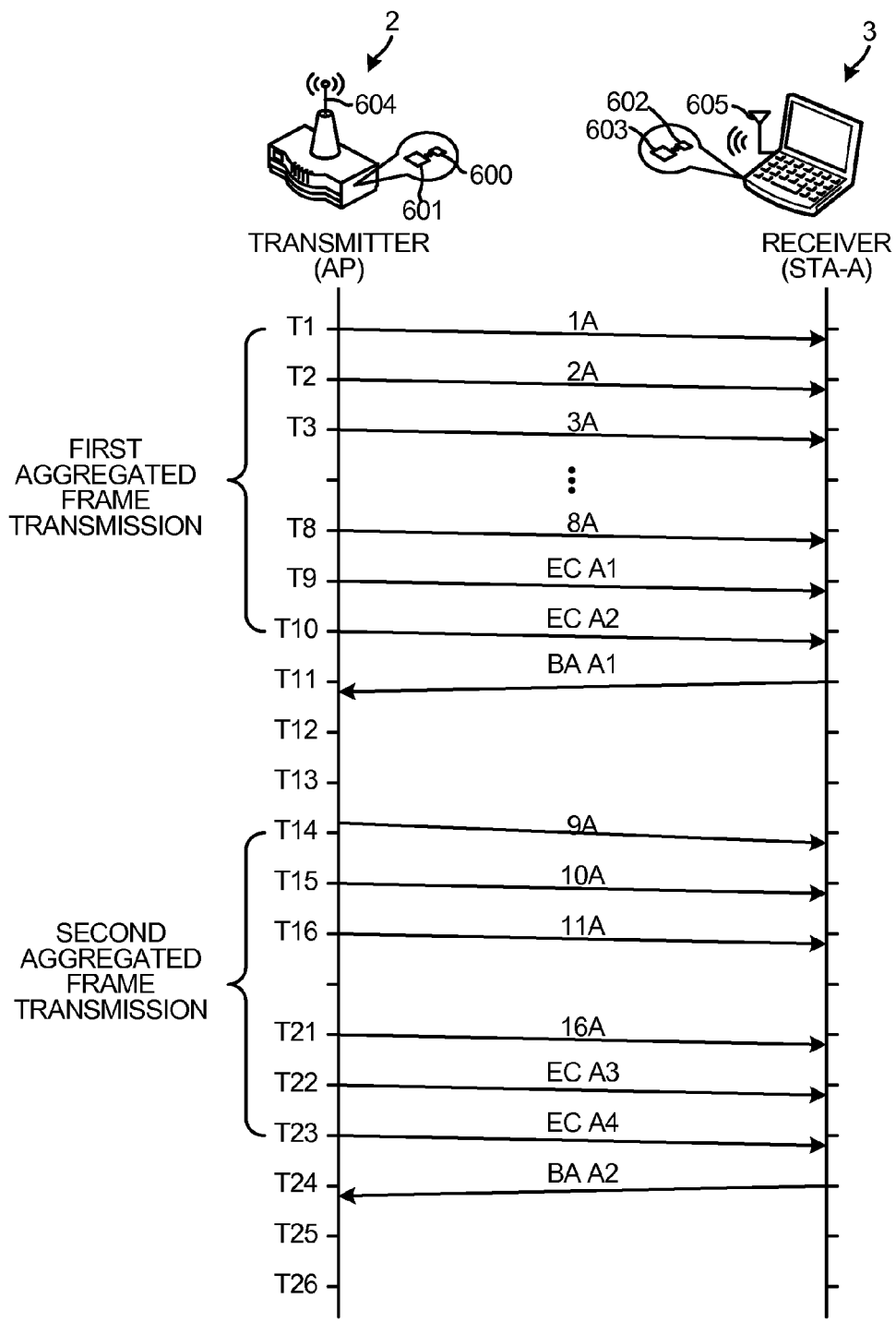
FIG. 16 illustrates how an A-MPDU of the type of FIG. 10 can be communicated from the AP to STA-A of FIG. 1 in one example.
Figure 17:
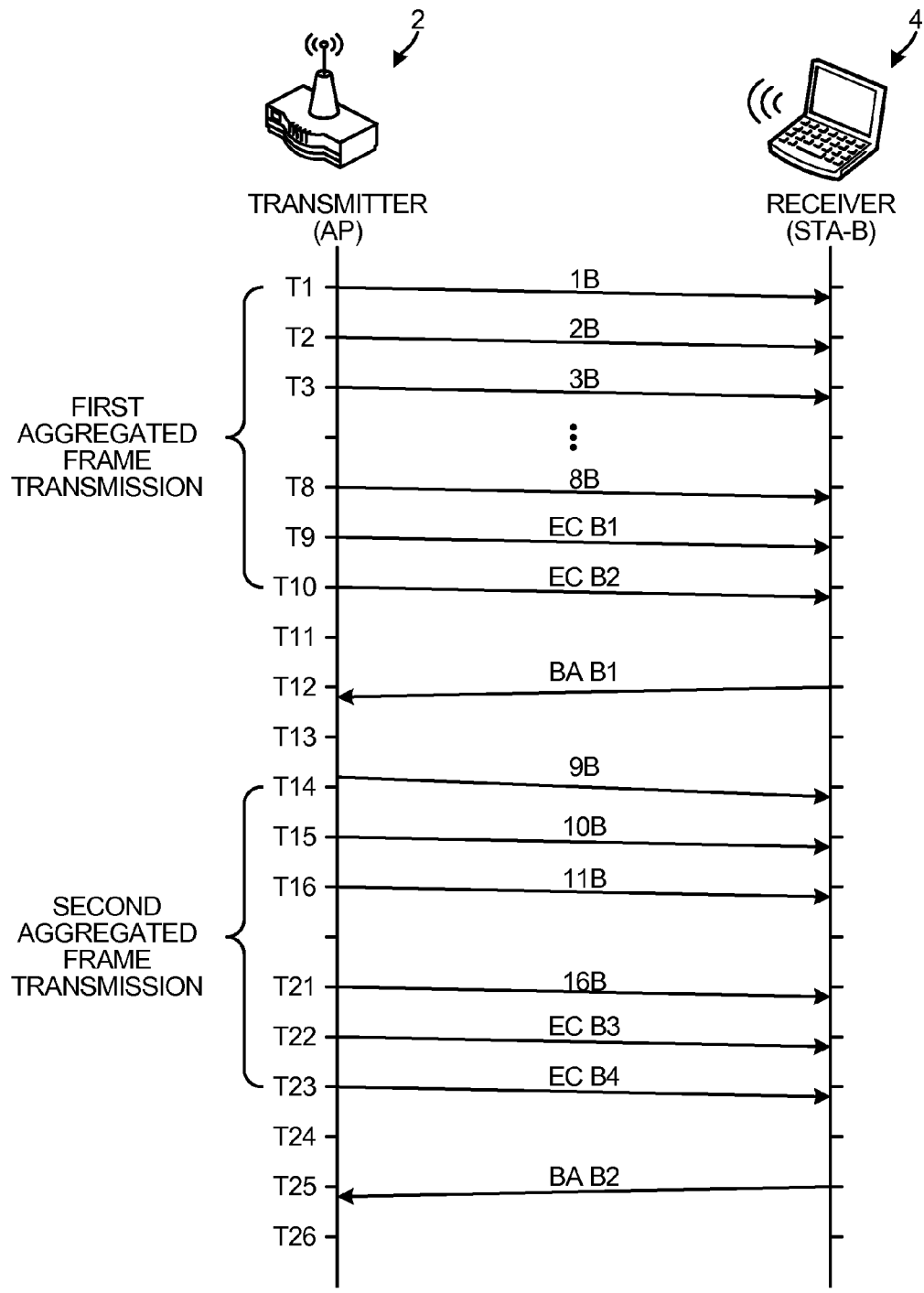
FIG. 17 illustrates how an A-MPDU of the type of FIG. 10 can be communicated from the AP to STA-B of FIG. 1 in the example of FIG. 16.
Figure 18:
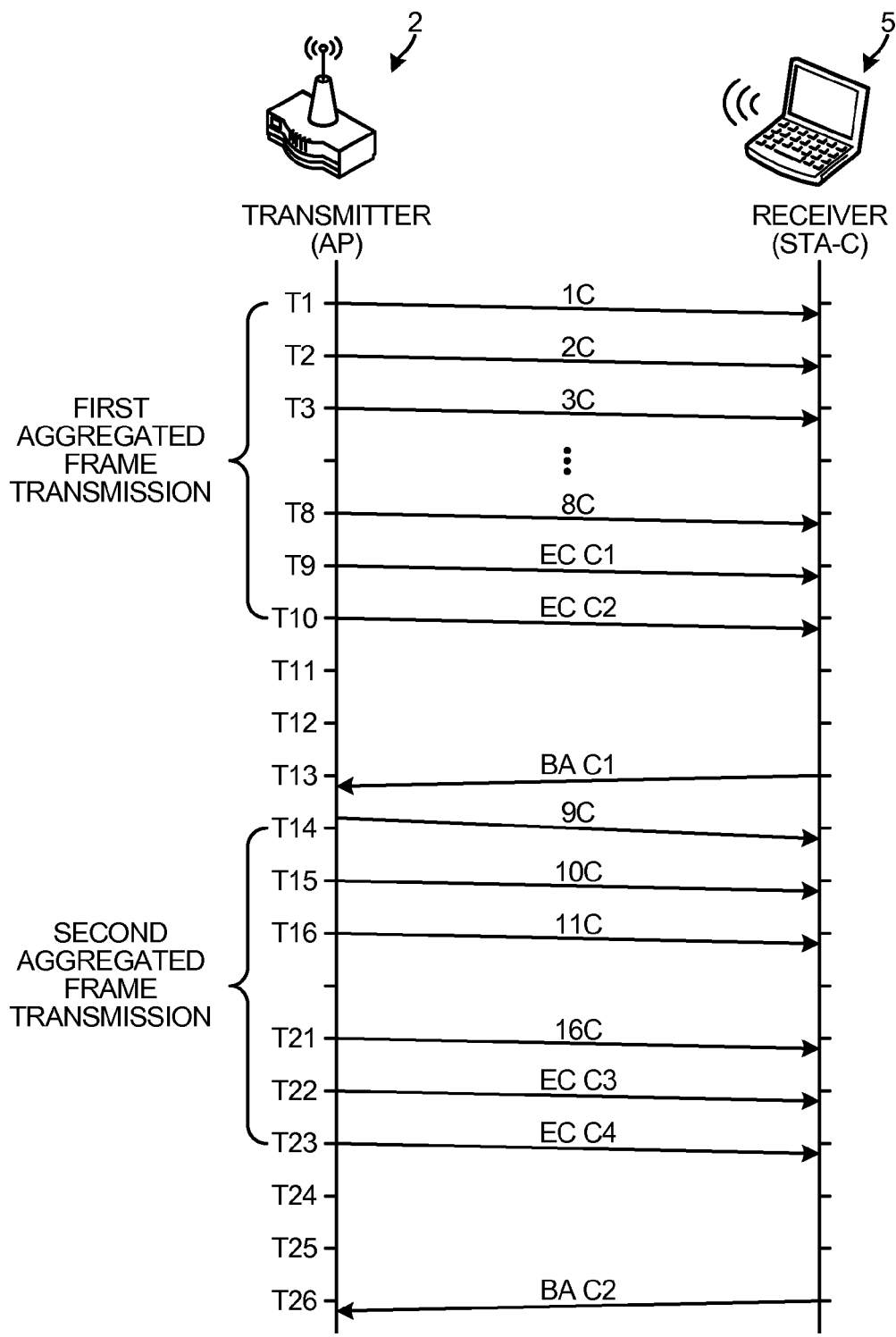
FIG. 18 illustrates how an A-MPDU of the type of FIG. 10 can be communicated from the AP to STA-C of FIG. 1 in the example of FIG. 16.
Figure 19:
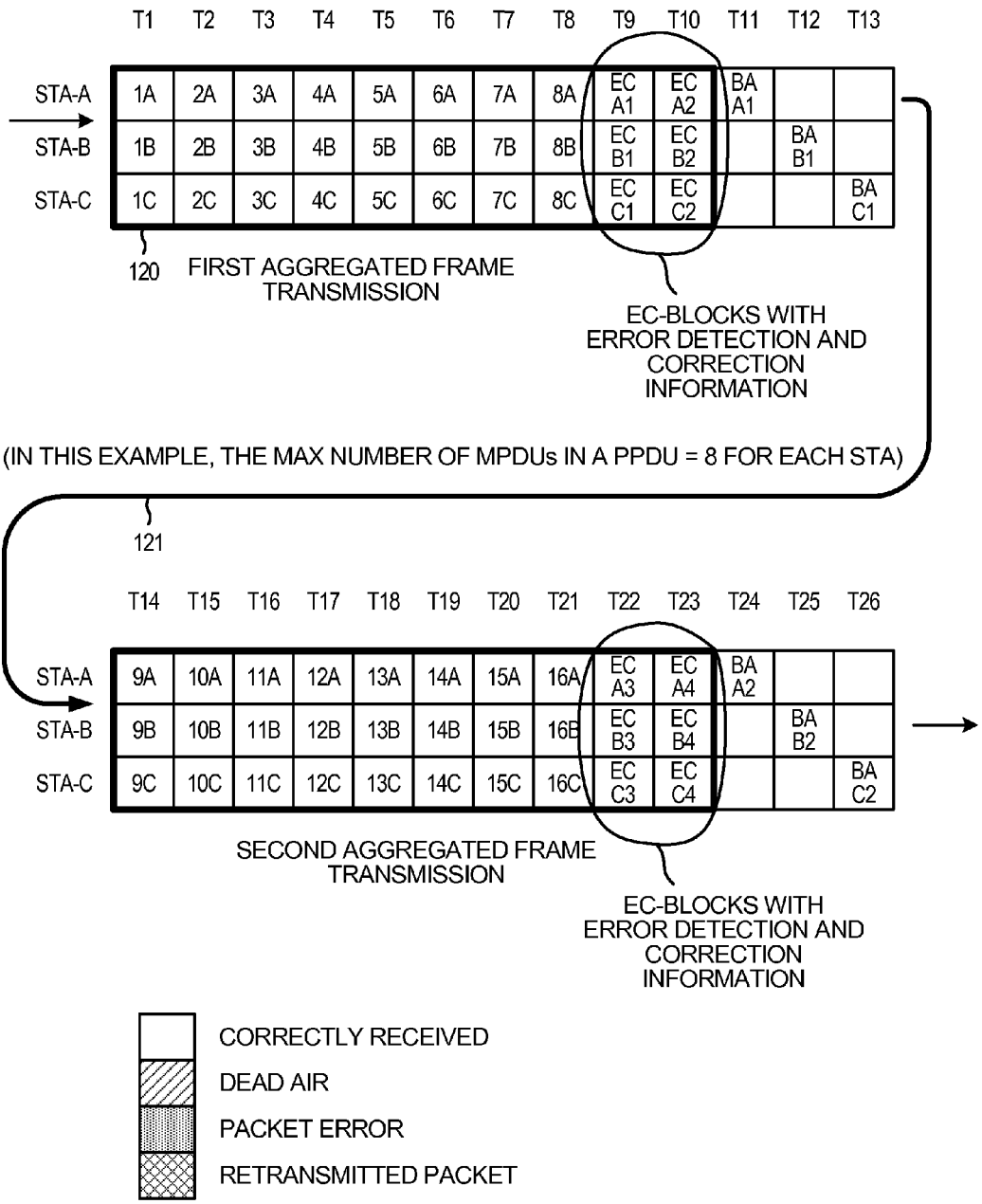
FIG. 19 is a diagram illustrating how the communication of FIGS. 16, 17 and 18 occur and how error correction coding information in EC-Blocks is used to increase network efficiency.

FIGS. 16-18 illustrate how A-MPDUs involving EC-Blocks can be communicated from AP 2 to the three mobile stations STA-A 3, STA-B 4 and STA-C 5. FIG. 19 is a diagram illustrating how the communication of FIGS. 16-18 occurs.

FIG. 16 illustrates how the AP 2 communicates with STA-A 3. After the AP communicates the PHY header, eight MPDUs are communicated from the AP to STA-A in a first A-MPDU. These MPDUs are designated 1A, 2A, 3A to 8A. In addition, two EC-Blocks are communicated from the AP to STA-A. These blocks are designated EC A1 and EC A2. In this example, STA-A properly receives all eight MPDUs. Errors in one or more of the MPDUs 1A-8A may be corrected using information carried in the EC-Blocks EC A1 and EC A2. If, for example, MPDU 2A were not properly received as in the example of FIG. 9, then this error is corrected. Accordingly, as shown in FIG. 19, none of the MPDUs 1A through 8A is marked as being a packet error. Next, as shown in FIG. 16, STA-A returns a BA (designated BA-A1) with a BA bitmap indicating that all MPDUs 1A through 8A were received correctly.

Next, the AP communicates a second PHY header for a second A-MPDU communication. Eight more MPDUs are communicated from the AP to STA-A in the second aggregated frame. These MPDUs are designated 9A, 10A, 11A to 16A. In addition, two more EC-Blocks are communicated from AP to STA-A in the second aggregated frame. These EC-Blocks are designated EC A3 and EC A4. Because there were no communication errors in the first A-MPDU due to use of the EC-Blocks A1 and A2, the smallest sequence number in the second A-MPDU is 9. AP 2 is therefore able to communicate MPDUs 9A, 10A, 11A and so forth up to 16A and fill all time slots in the second A-MPDU. This is more efficient than the scenario of FIG. 6 and FIG. 9 described above, where AP 2 was not able to communicate MPDUs to STA-A in six of the eight time slots of the second aggregated frame.

FIG. 17 illustrates how AP 2 communicates with STA-B 4. The communication with STA-B is very similar to the way the AP communicates with STA-A as described above. After the AP communicates the PHY header, eight MPDUs are communicated from the AP to STA-B in a first aggregated frame. These MPDUs are designated 1B, 2B, 3B to 8B. In addition EC-Blocks EC B1 and EC B2 are communicated. In this example, STA-B properly receives all eight MPDUs. Errors in one or more of the MPDUs 1B-8B may be corrected using information carried in the EC-Blocks EC B1 and EC B2. If, for example, MPDU 4B were not properly received as in the example of FIG. 9, then this error could be corrected. Accordingly, as shown in FIG. 19, none of the MPDUs 1B through 8B is marked as being a packet error. As shown in FIG. 17, STA-B then returns a BA (designated BA-B1) with a BA bitmap indicating that all eight MPDUs were received correctly.

Next, AP 2 communicates a second PHY header for a second A-MPDU communication to STA-B. Eight more MPDUs are communicated from the AP to STA-B in the second aggregated frame. These MPDUs are designated 9B, 10B, 11B to 16B. Two additional EC-Blocks EC B3 and EC B4 are included in the second A-MPDU to STA-B. Because there were no communication errors in the first A-MPDU due to use of the EC-Blocks of the first A-MPDU, the smallest sequence number in the second A-MPDU is 9. AP 2 is therefore able to communicate MPDUs 9B, 10B, 11B and so forth up to 16B and fill all time slots in the second A-MPDU sent to STA-B. This is more efficient than the scenario of FIG. 7 and FIG. 9 described above, where the AP was not able to communicate MPDUs to STA-B in four of the eight time slots of the second aggregated frame.

FIG. 18 illustrates how AP 2 communicates with STA-C 5. Again, any errors in the communication of the MPDUs in an A-MPDU are corrected using error correction coding information carried in the EC-Blocks of the A-MPDU. An error that can be corrected may be an MPDU erasure error or a corruption of an MPDU. All time slots of the first and second A-MPDUs are used to communicate information from the AP to the STA-C.

FIG. 19 is a diagram illustrating how the communication of FIGS. 16, 17 and 18 occurs. Previously (not shown in FIG. 19) the PHY headers for each of the A-MPDUs of FIGS. 16, 17 and 18 are communicated from the AP. STA-A receives the PHY header of the A-MPDU transmitted to it, STA-B receives the PHY header of the A-MPDU transmitted to it, and STA-C receives the PHY header of the A-MPDU transmitted to it. Then, in time slot T1 the AP communicates MPDU 1A to STA-A, MPDU 1B to STA-B, and MPDU 1C to STA-C. These MPDUs are communicated simultaneously, but due to the operation of the system each mobile station is able to receive its intended MPDU and is able to ignore the other transmissions. This communication of MPDUs continues in this way from time slot to time slot. After the eight MPDUs of the legacy section of the A-MPDU have been received by a mobile station, the AP communicates two EC-Blocks to the mobile station at the end of the A-MPDU in time slots T9 and T10 as illustrated. Each mobile station receives its corresponding A-MPDU in similar fashion and can use the error correction coding information carried in the EC-Blocks to correct errors in the communication of the MPDUs of the legacy section. Accordingly, no MPDU is marked in FIG. 19 as having been a packet error. The dark block 120 in FIG. 19 indicates the first aggregated frame transmissions of 30 MPDUs. STA-A returns its BA (BA-A1) in time slot T11, STA-B returns its BA (BA-B1) in time slot T12, and STA-C returns its BA (BA-C1) in time slot T13. The heavy arrow 121 indicates subsequent process flow. Physical layer headers for the second A-MPDUs are communicated to the mobile stations (not shown) and then the second set of A-MPDUs of 30 more MPDUs is communicated starting at time slot T14. Because all MPDUs of the first set of A-MPDUs were communicated successfully, no retransmission of MPDUs is necessary in the second set of A-MPDUs, and the lowest sequence number to be transmitted to each mobile station in the second set of A-MPDUs is 9. Consequently, the largest sequence number that can be transmitted in the second set of A-MPDUs is 16. Accordingly, the AP can transmit MPDUs to each of the three mobile stations in time slots T14-T21 as illustrated. All time slots are used. After the time slots T22 and T23 used to communicate the error correction coding information EC-Blocks, STA-A returns a BA in time slot T24, STA-B returns a BA in time slot T25 and STA-C returns a BA in time slot T26.

Figure 20:
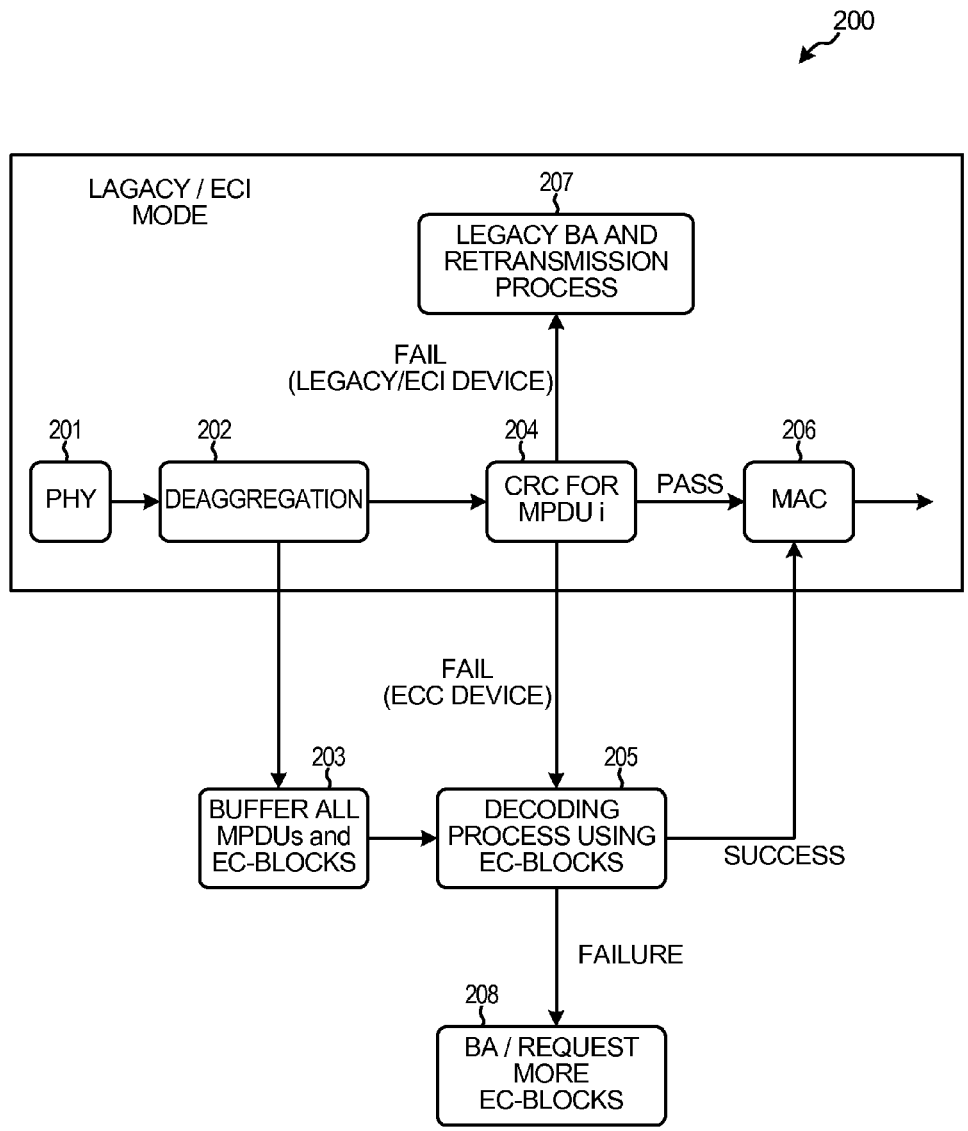
FIG. 20 is a diagram illustrating how a receiver in a first mode can use EC-Blocks of A-MPDUs to improve network efficiency and in a second mode can receive but ignore the EC-Blocks.

FIG. 20 is a diagram of the receiver structure 200. The incoming A-MPDU passes through physical layer protocol processing 201, and the MPDUs are deaggregated 202. If the receiver supports use of EC-Blocks, then the MPDUs and EC-Blocks are buffered 203. Each MPDU is then considered 204. If its CRC indicates that the MPDU was not properly communicated, then there are two possibilities. If the receiver supports the error correction functionality using EC-Blocks as described above, then processing proceeds downward. Error correction coding information in the EC-Blocks of the A-MPDU and one or more of the MPDUs that are buffered 203 are used by a Fountain decoder to correct the erroneous MPDU 205. The process of correcting erroneous MPDUs by the Fountain decoder can be implemented in the hardware of the receiver apparatus and/or in the software of the receiver apparatus. The Fountain decoder may correct the erroneous MPDUs one by one, or may try to correct them jointly. Furthermore, instead of buffering all the MPDUs and EC-Blocks 203, each MPDU or EC-Block that is received with a CRC indicating correct reception may be directly fed to the Fountain decoder, and the Fountain decoder may buffer a subset of them, possibly after some processing, to be used for correcting erroneous MPDUs. The resulting correct MPDU is passed to the MAC protocol processing layer 206 for further processing.

If the Fountain decoder is not able to correct one or more of the erroneous MPDUs, then signaling is used to indicate to the transmitter that some of the MPDUs where not correctly received 208. This signaling may comprise transmitting a standard legacy BA to the transmitter, where the appropriate bits in the bitmap of the BA corresponding to the uncorrected erroneous MPDUs are marked. In response, the transmitter may retransmit the uncorrected erroneous MPDUs in its next transmission, similar to a standard legacy retransmission process. Alternatively, instead of the legacy BA, a message may be sent from the receiver to the transmitter to ask for additional EC-Blocks to be transmitted. In response, the transmitter transmits additional EC-Blocks to the receiver to assists its Fountain decoding process. These additional EC-Blocks may be generated and buffered at the transmitter in advance, or they may be generated upon the receipt of the request from the receiver for additional EC-Blocks. If, however, the receiver does not support the error correction functionality involving EC-Blocks, then processing proceeds upward. Standard legacy BA signaling is used 207 to indicate the failed communication of the MPDU by marking the appropriate bit in the bitmap of a BA and by sending the BA back to the AP. This prompts the AP to retransmit the erroneous MPDU in legacy fashion. If the MPDU was properly received as determined in block 204, then the MPDU is passed up to the MAC protocol processing layer 206.

Figure 21:
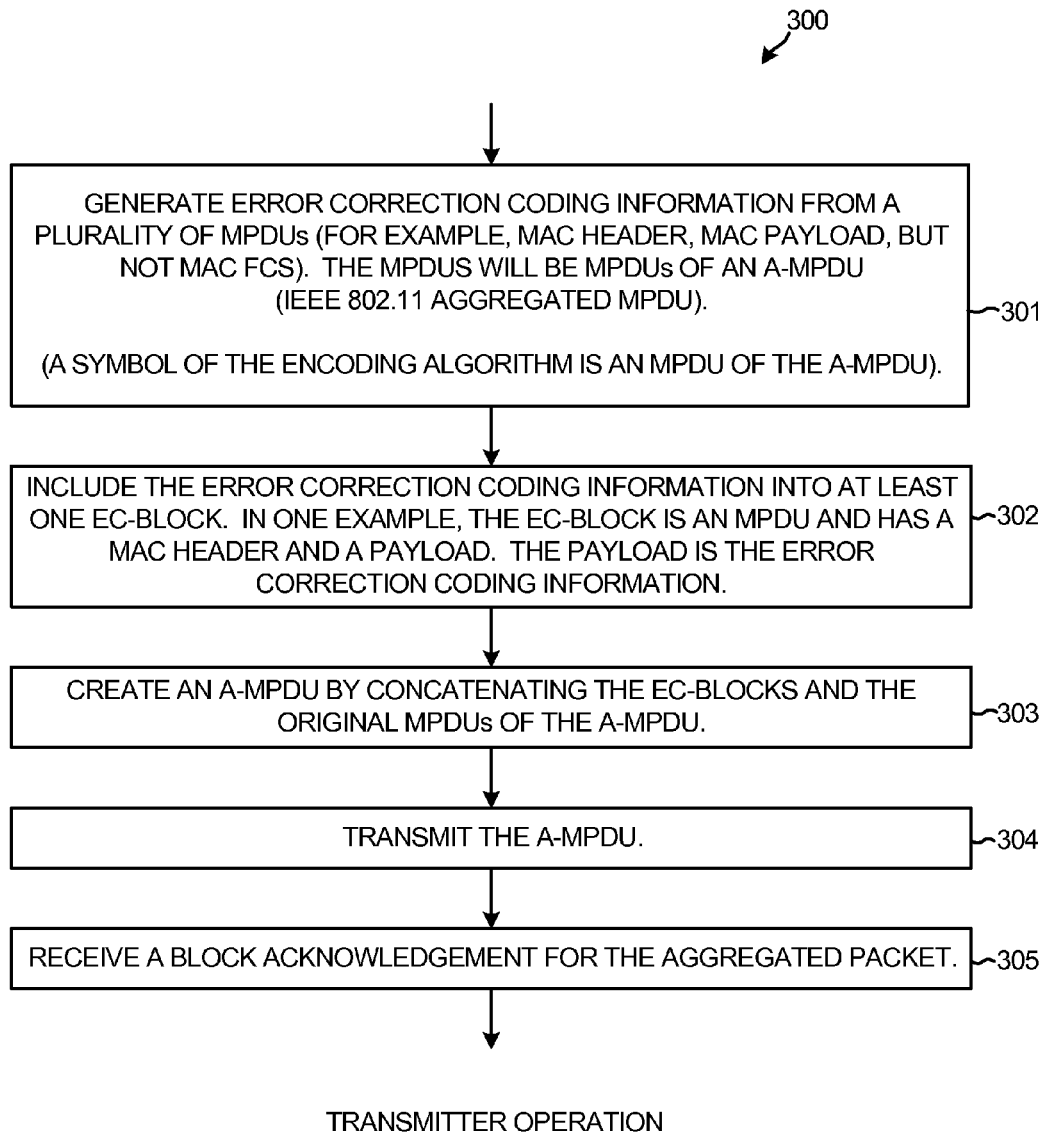
FIG. 21 is a flowchart of a method 300 in which a transmitter generates and transmits an A-MPDU of the type illustrated in FIG. 10.

FIG. 21 is a simplified flowchart of a method 300 of transmitter operation in accordance with one novel aspect. Error correction coding information is generated (step 301) from the MPDUs that are to make up an A-MPDU. In one example, the bits of the MAC headers, and payloads are used to determine this error correction coding information, but the MAC FCSs are not used. For an example of how the error correction coding information can be generated using a Fountain coding scheme, see FIG. 11. Next (step 302) the error correction coding information is included as the payloads of one or more EC-Blocks. In one example, the EC-Blocks are MPDUs where each EC-Block has a MAC header, a payload containing error correction coding information, and a MAC FCS.

Next, an A-MPDU is created (step 303) by concatenating appending the EC-Blocks onto the end of a string of the original MPDUs. Next, the A-MPDU is transmitted (step 304). For an example how the resulting A-MPDU is transmitted as part of a physical layer PPDU, see the PPDU 100 of FIG. 10. PPDU 100 includes a PHY header 101 and the A-MPDU 102 that includes a novel parity section 104 of EC-Blocks. Lastly, a Block Acknowledgement (BA) for the aggregated packet is received (step 305).

Figure 22:
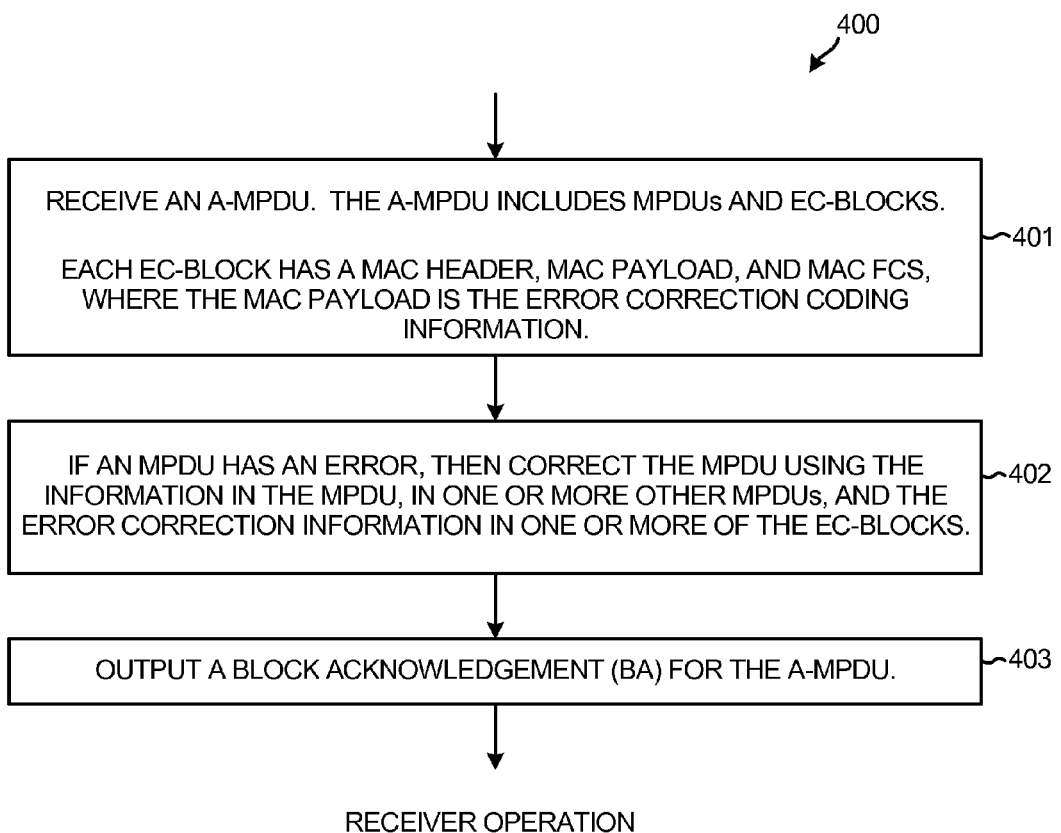
FIG. 22 is a flowchart of a method 400 in which a receiver receives and uses an A-MPDU of the type illustrated in FIG. 10.

FIG. 22 is a simplified diagram of a method 400 of receiver operation in accordance with one novel aspect. In a first step (step 401), an A-MPDU is received (step 401) where the A-MPDU includes a set of MPDUs of a legacy portion as well as a set of EC-Blocks of a parity section. In one example, each EC-Block is an MPDU and has a MAC header, a payload, and a MAC FCS. As described above, the payload contains packet-level error correction coding information for MPDUs of the legacy section. In one example, the payload of a first EC-Block includes error correction coding information for a first set of the MPDUs of the A-MPDU, the payload of a second EC-Block includes error correction coding information for a second set of MPDUs of the A-MPDU, and so forth. Next (step 402), if an MPDU of the legacy section has an error, then the MPDU with the error is corrected using: 1) the error correction coding information carried in one or more of the EC-Blocks, and 2) the information in the MPDU (some of this information may be useful even though other parts of it may be corrupted), and 3) one or more other MPDUs of the legacy section. The receiver may be operable in two modes as set forth in FIG. 20: in a first mode the receiver receives and uses information in EC-Blocks, and in a second mode the receiver receives EC-Blocks but it ignores the EC-Blocks. In one example, receiver operation is as set forth in FIG. 19 where EC-Blocks are used in a Fountain decoding scheme to correct errors in the current extended A-MPDU such that the AP can then transmit more MPDUs in a subsequent A-MPDU as compared to a conventional situation as shown in FIG. 9 where restrictions on the maximum difference in sequence numbers would result in the AP not being able to transmit during much of a second A-MPDU. Lastly (step 403), the receiver outputs a Block Acknowledgement (BA) for the A-MPDU received.

Figure 23:
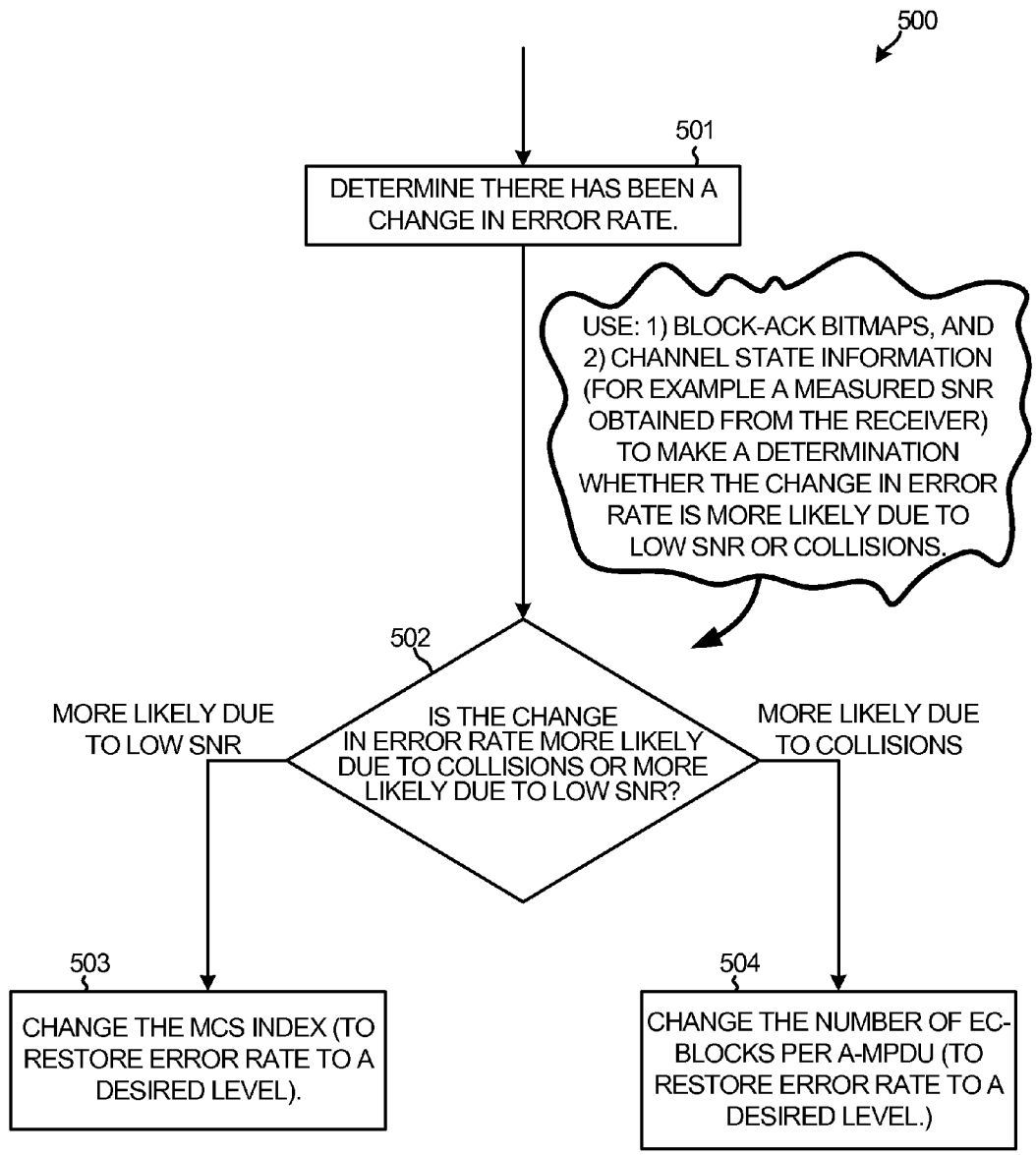
FIG. 23 is a flowchart of a method 500 in which a transmitter adjusts a transmission error rate by selectively either adjusting an MCS index or adjusting the number of EC-Blocks per A-MPDU.

FIG. 23 is a flowchart of a rate adaptation method 500 carried out in a transmitter such as in the transmitter in AP 2. In a first step (501), a determination is made that there has been a change in error rate in transmission from the AP. In one example, this change is an undesirable increase in error rate beyond a predetermined error rate level. Next (step 502), a determination is made in the transmitter as to whether the change in error rate is more likely due to collisions or is more like due to a low SNR (Signal-to-Noise Ratio). In one example, two items of information are used as input information to make this determination: 1) BA bitmaps of one or more Block ACKs (BAs), 2) channel state information (for example, a measured SNR obtained from the receiver of the AP). If the bits in the BA bitmaps that flag errors occur randomly then this tends to indicate that the reason behind the change in error rate is likely collisions, whereas if the bits in the bitmaps that flag errors occur with a non-random pattern then this tends to indicate that the reason behind the change in error rate is likely due to burst errors and a low SNR. In the case where the channel state information is a measured SNR (as provided by the receiver of the AP), decision block 502 also has a direct indication of whether the SNR is inadequately low or has changed. The determination (step 502) is an output of a function of two inputs: 1) BA bitmaps of one or more BAs, and 2) channel state information. The determination can also involve use of other input information.

If the determination (step 502) is that the change in error rate is more likely due to low SNR or poor channel conditions, then the MCS (Modulation and Coding Scheme) Index is changed (step 503). For example, the MCS index can be reduced to decrease error rate and to restore the error rate to a desired level. For each different MCS index value there is corresponding pair of a specified coding rate and a specified modulation order. This coding rate and modulation order are used by the physical layer in the transmission of packets. Generally decreasing the MCS index value serves to reduce the data rate of transmissions from the AP but also serves to reduce error rate. The MAC layer of AP 2 carries out the change (step 503) of MCS index indirectly by instructing the PHY layer of AP 2 to change the MCS index it uses.

If, on the other hand, the determination (step 502) is that the change in error rate is more likely due to collisions with transmissions from the same network or a nearby network, then the number of EC-Blocks per A-MPDU is changed (step 504). For example, the number of EC-Blocks per A-MPDU can be increased to decrease error rate and to restore the error rate to a desired level. This change is made within the MAC protocol processing layer of AP 2. Increasing the number of EC-Blocks per A-MPDU allows more error correction coding information to be provided in the A-MPDU, and therefore allows more correcting of corrupted MPDUs of an A-MPDU, and therefore serves to reduce error rate.

The transmitter can use the Channel State Information (CSI) reported by the receiver to determine the change in the channel condition, and therefore the need for changing the MCS index. The CSI may comprise an estimated SNR, a Received Signal Strength Indication (RSSI), a Channel Quality Indicator (CQI), or an estimate of the channel coefficients. Furthermore, the transmitter may use information in the acknowledgment messages to determine the main cause of error in the MPDUs, and to determine whether to change the MCS index or the number of EC-Blocks per A-MPDU. For example, the distribution of the erroneous MPDUs across the A-MPDU can be obtained from the BA message. If the errors have a random distribution, this may be an indication of a reduced channel and SNR conditions. On the other hand, if errors have a burst pattern where in the A-MPDUs a group of nearby MPDUs are in error, then this may be an indication of a persistent collision from another device, such as a hidden node. In this case the number of EC-Blocks may be changed.

Note that, although MCS index change is mostly needed when channel conditions change, the transmitter may also choose to change the number of EC-Blocks if the change in the channel condition is not very significant. This is because changing the number of EC-Blocks enables a more gradual change in the effective data rate than changing the MCS index.

Although the method 500 of FIG. 23 is described above in connection with an example in which the change in error rate is an increase in error rate, the change determined in step 501 can be a decrease in error rate. If the decrease in error rate is likely due to an increase in SNR then the MCS index value can be increased in step 503, whereas if the decrease in error rate is likely due to a reduced number of collisions then the number of EC-Blocks per A-MPDU can be reduced in step 504. The levels of the MCS index and the number of EC-Blocks per A-MPDU can be controlled and balanced with respect to one another using method 500 to maintain a target error rate.

In one or more exemplary embodiments, the functions described may be implemented in hardware, software, firmware, or any combination thereof If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In one example, AP 2 is a transmitter device (see FIG. 16) that includes a processor 600 and an amount of semiconductor memory 601 (a processor-readable medium) that the processor 600 can access via a bus mechanism. A program of processor-executable instructions is stored in the memory. The program includes code for carrying out the protocol processing of the layers of the stack including MAC layer processing and Raptor encoding to form EC-Blocks. Execution of this code causes processor 600 to form A-MPDUs that include EC-Blocks. Reference numeral 604 identifies an antenna of AP 2. Processor 600 and associated software in memory 601 generate aggregated packets using Raptor encoding and cause the aggregated packets to be output from AP 2 via antenna 604.

In one example, STA-A is a receiver device (see FIG. 16) that includes a processor 602 and an amount of semiconductor memory 603 (a processor-readable medium) that the processor 602 can access via a bus mechanism. A program of processor-executable instructions is stored in the memory. The program includes code for carrying out the protocol processing of the layers of the stack including MAC layer processing. Execution of this code causes processor 602 to receive and decode A-MPDUs that include EC-Blocks such that corrupted or missing data is recovered. Raptor decoding and the associated error correction processes are carried out by processor 602 under control of this software. Reference numeral 605 identifies an antenna of STA-A 3. Processor 602 and associated software in memory 603 cause aggregated packets to be received via antenna 605 and cause Raptor decoding to be used to perform error correction on packets of the aggregated packet that were either not received at all or were received with errors.

Although certain specific embodiments are described above for instructional purposes, the teachings of this patent document have general applicability and are not limited to the specific embodiments described above. The use of Fountain-encoded error correction information carried in an aggregated packet to erasure-protect the payload of the aggregated packet is not limited to AP-to-STA communications, is not limited to WiFi, is not limited to A-MPDUs, is not limited to IEEE 802.11 standard compliant systems, and is not limited to wireless communications, but rather applies to networking in general. Accordingly, various modifications, adaptations, and combinations of the various features of the described specific embodiments can be practiced without departing from the scope of the claims that are set forth below.

What is claimed is:

1. A method comprising:
removing from each MPDU (MAC Protocol Data Unit) in a legacy section a corresponding MAC FCS (Frame Check Sequence) to provide a plurality of source symbols;
encoding the plurality of source symbols with a Fountain coding scheme to generate error correction coding information;
forming at least one EC-Block (Error Correction Block), wherein the at least one EC-Block includes the error correction coding information;
generating an A-MPDU (Aggregated MPDU), the A-MPDU including the legacy section and said at least one EC-Block;
transmitting the A-MPDU; and
determining that an error rate is more likely due to collisions than low SNR (Signal-To-Noise Ratio), and in response adjusting a number of EC-Blocks in a next transmitted A-MPDU.

2. The method of claim 1, further comprising:
receiving a block acknowledgement for the transmitted A-MPDU.

3. The method of claim 2, wherein the block acknowledgement conforms to an IEEE 802.11 standard, and wherein the block acknowledgement includes a bitmap that indicates a status of each MPDU in the legacy section.

4. The method of claim 1, wherein the Fountain coding scheme is taken from the group consisting of: a Raptor forward error correction coding scheme, a RaptorQ forward error correction coding scheme.

5. The method of claim 1, wherein said at least one EC-Block is at least one MPDU.

6. The method of claim 1, wherein said at least one EC-Block is a block that includes no header.

7. The method of claim 1, wherein the generating the A-MPDU involves including the A-MPDU into a physical layer packet, wherein the physical layer packet includes a physical layer header portion and a physical layer payload portion, wherein the A-MPDU is the physical layer payload portion of the physical layer packet.

8. A transmitter device, comprising:
an antenna;
means for removing, the means for removing to remove from each MPDU (MAC Protocol Data Unit) in a legacy section a corresponding MAC FCS (Frame Check Sequence) to provide a plurality of source symbols;
means for encoding, the means for encoding to encode the plurality of source symbols with a Fountain coding scheme to generate error correction coding information;
means for forming a parity section, the means for forming a parity section to form at least one EC-Block (Error Correction Block), wherein the at least one EC-Block includes the error correction coding information;
means for generating an aggregated packet, the means for generating an aggregated packet to generate an A-MPDU (Aggregated MPDU) to include the legacy section and the at least one EC-Block; and
means for transmitting the A-MPDU via the antenna; and means for determining that an error rate is more likely due to collisions than low SNR (Signal-To-Noise Ratio), and in response adjusting a number of EC-Blocks in a next transmitted A-MPDU.

9. The transmitter device of claim 8, wherein the transmitter device is an Access Point device (AP) that operates in accordance with an IEEE 802.11 standard.

10. A processor-readable non-transitory medium storing a set of processor-executable instructions, wherein execution of the set of processor-executable instructions by a processor performs a process comprising:
   removing from each MPDU (MAC Protocol Data Unit) in a legacy section a corresponding MAC FCS (Frame Check Sequence) to provide a plurality of source symbols;
   encoding the plurality of source symbols with a Fountain coding scheme to generate error correction coding information;
   forming at least one EC-Block (Error Correction Block), wherein the at least one EC-Block includes the error correction coding information;
   generating an A-MPDU (Aggregated MPDU), wherein the A-MPDU includes the legacy section and said at least one EC-Block; and
   determining that an error rate is more likely due to collisions than low SNR (Signal-To-Noise Ratio), and in response adjusting a number of EC-Blocks in a next transmitted A-MPDU.

11. A method comprising:
   (a) determining that a change in a transmission error rate has occurred;
   (b) in response to (a) making a determination of whether to change an MCS (Modulation and Coding Scheme) index value or whether to change an amount of error correction information carried per A-MPDU (Aggregated Medium Access Control Protocol Data Unit), wherein the determination of (b) is a function of one or more Block-Acknowledgements (BA); and
   (c) transmitting the A-MPDU packets from access point.

12. The method of claim 11, wherein (a) and (b) are performed by an Access Point device (AP), and wherein the AP device is adapted to change the amount of error correction information carried per A-MPDU by changing a number of EC-Blocks (Error Correction Blocks) included in each A-MPDU.

13. The method of claim 11, wherein the determination of (b) is also a function of Channel State Information (CSI).

14. An apparatus comprising:
   an antenna via which the apparatus receives one or more Block-Acknowledgements (BAs) and via which the apparatus outputs one or more A-MPDUs (Aggregated Medium Access Control Protocol Data Units), wherein each A-MPDU carries an amount of error correction information; and
   a processor that makes a determination of whether to change an MCS (Modulation and Coding Scheme) index value or whether to change an amount of error correction information carried per A-MPDU, wherein the determination is a function of said one or more BAs.

15. An apparatus comprising:
   an antenna via which the apparatus receives one or more Block-Acknowledgements (BAs) and via which the apparatus outputs a plurality of A-MPDUs (Aggregated Medium Access Control Protocol Data Units), wherein each A-MPDU carries an amount of error correction information; and
   means for making a determination of whether to change an MCS (Modulation and Coding Scheme) index value or whether to change an amount of error correction information carried per A-MPDU, wherein the determination is a function of said one or more BAs.

* * * * *